United States Patent [19]
Aylwin et al.

[11] Patent Number: 5,675,461
[45] Date of Patent: *Oct. 7, 1997

[54] THIN FILM MAGNETIC RECORDING HEAD FOR MINIMIZING UNDERSHOOTS

[75] Inventors: Pedro A. Aylwin, Santa Barbara; Brinton W. Corb, Goleta, both of Calif.

[73] Assignee: Applied Magnetics Corporation, Goleta, Calif.

[*] Notice: The term of this patent shall not extend beyond the expiration date of Pat. No. 5,452,166.

[21] Appl. No.: 683,847

[22] Filed: Jul. 19, 1996

Related U.S. Application Data

[60] Continuation of Ser. No. 514,760, Aug. 14, 1995, which is a division of Ser. No. 130,285, Oct. 1, 1993, Pat. No. 5,452,166.

[51] Int. Cl.$^6$ .......................... G11B 5/147; G11B 5/187
[52] U.S. Cl. ............................ 360/126; 360/122
[58] Field of Search ............................ 360/110, 119, 360/122, 125, 126; 29/603.01, 603.15, 603.16, 603.08, 603.18; 336/98

[56] References Cited

U.S. PATENT DOCUMENTS

| | | | |
|---|---|---|---|
| 2,653,189 | 9/1953 | Camras | 179/100.2 |
| 3,154,707 | 10/1964 | Bright | 310/166 |
| 3,155,949 | 11/1964 | Tibbetts | 340/174.1 |
| 3,353,168 | 11/1967 | Poumakis | 340/174.1 |
| 3,505,818 | 4/1970 | Cross et al. | 60/242 |
| 3,562,443 | 2/1971 | Bos et al. | 179/100.2 |
| 3,562,620 | 2/1971 | Haslehurst | 318/616 |
| 3,568,907 | 3/1971 | Watson | 226/97 |

(List continued on next page.)

FOREIGN PATENT DOCUMENTS

| | | |
|---|---|---|
| 5233712 | 3/1977 | Japan . |
| 54-23517 | 2/1979 | Japan . |
| 55-139625 | 10/1980 | Japan . |
| 56-107363 | 8/1981 | Japan .................................... 360/103 |
| 59-227065 | 12/1984 | Japan .................................... 360/102 |
| 2008320 | 1/1987 | Japan . |
| 2008321 | 1/1987 | Japan . |

OTHER PUBLICATIONS

Dennis A. Lindholm, "Long Wavelength Response of Magnetic Heads With Beveled Outer Edges", *Journal of Audio Engineers Society*, vol. 27, No. 7/81, pp. 542–547 (1979).

M. Helle and J.P. Lazzari, "Experimental Study of the External Fringing Field on Integrated Head", *IEEE Transactions on Magnetics*, vol. 11, No. 5, pp. 1221–1223 (1975).

(List continued on next page.)

*Primary Examiner*—Robert S. Tupper
*Assistant Examiner*—David L. Ometz
*Attorney, Agent, or Firm*—Knobbe, Martens, Olson & Bear, LLP

[57] ABSTRACT

An improved thin film magnetic recording head includes a pole tip assembly which has a precisely formed physical geometry. The physical geometry of the pole tip assembly minimizes deleterious effects due roundershoots, while the method of manufacturing the pole tip assembly allows for precise control of feature tolerances (up to 0.2 micrometer accuracy) of the pole tip assembly. In one embodiment, the pole tip assembly has a generally hexagonal configuration with a raised hexagonal center portion comprising leading and trailing pole tips and a raised gap portion, and a surrounding hexagonal trench which surrounds the raised center portion. The raised center portion is substantially flush with the surrounding face of the recording head. Alternative embodiments contemplate elliptical or circular raised center portions, and variously shaped trenches to facilitate the evacuation of debris. The method of manufacturing the improved recording head includes the steps of lapping the face of the head to form an air bearing surface, and ion milling the face of the head to form the desired features (i.e., the desired pole tip configuration). The ion milling is typically done to a depth of less than 2 micrometers which allows precise control of the feature tolerances.

3 Claims, 14 Drawing Sheets

U.S. PATENT DOCUMENTS

| | | | |
|---|---|---|---|
| 3,700,827 | 10/1972 | Nagao | 179/100.2 |
| 3,802,523 | 4/1974 | Clark | 177/146 |
| 3,860,958 | 1/1975 | Hanson | 360/57 |
| 3,905,215 | 9/1975 | Wright | 73/382 |
| 3,975,771 | 8/1976 | Lazzari | 360/104 |
| 3,975,773 | 8/1976 | Dejouhanet et al. | 360/126 |
| 4,016,601 | 4/1977 | Lazzari | 360/122 |
| 4,092,688 | 5/1978 | Nomura et al. | 360/121 |
| 4,127,884 | 11/1978 | Nouchi et al. | 360/119 |
| 4,190,872 | 2/1980 | Jones, Jr. et al. | 360/125 |
| 4,219,853 | 8/1980 | Albert et al. | 360/103 |
| 4,290,088 | 9/1981 | Beecroft | 360/66 |
| 4,295,173 | 10/1981 | Romankiw et al. | 360/125 |
| 4,307,179 | 12/1981 | Chang et al. | 430/314 |
| 4,370,801 | 2/1983 | Roscamp et al. | 29/603 |
| 4,380,784 | 4/1983 | Desserre et al. | 360/126 |
| 4,402,341 | 9/1983 | Reip | 137/489 |
| 4,404,609 | 9/1983 | Jones, Jr. | 360/126 |
| 4,419,704 | 12/1983 | Radman et al. | 360/102 |
| 4,436,593 | 3/1984 | Osborne et al. | 204/15 |
| 4,510,231 | 4/1985 | Takeshita et al. | 360/126 |
| 4,511,942 | 4/1985 | Valstyn | 360/126 |
| 4,516,180 | 5/1985 | Narishige et al. | 360/126 |
| 4,523,133 | 6/1985 | Messenger | 318/7 |
| 4,529,659 | 7/1985 | Hoshino et al. | 360/135 |
| 4,530,021 | 7/1985 | Cameron | 360/97 |
| 4,543,320 | 9/1985 | Vijan | 430/314 |
| 4,549,238 | 10/1985 | Ertingshausen et al. | 360/103 |
| 4,555,739 | 11/1985 | Le Van et al. | 360/103 |
| 4,556,925 | 12/1985 | Suenaga et al. | 360/113 |
| 4,557,995 | 12/1985 | Broers et al. | 430/296 |
| 4,589,036 | 5/1986 | Bertschy et al. | 360/75 |
| 4,624,048 | 11/1986 | Hinkel et al. | 29/603 |
| 4,636,897 | 1/1987 | Nakamura et al. | 360/119 |
| 4,636,901 | 1/1987 | Ohura et al. | 360/126 |
| 4,637,897 | 1/1987 | Nakamura et al. | 252/299.63 |
| 4,639,289 | 1/1987 | Lazzari | 156/643 |
| 4,644,421 | 2/1987 | Miwa et al. | 360/66 |
| 4,646,184 | 2/1987 | Goto et al. | 360/110 |
| 4,649,448 | 3/1987 | Nakajima et al. | 360/122 |
| 4,652,954 | 3/1987 | Church | 360/120 |
| 4,652,956 | 3/1987 | Schewe | 360/123 |
| 4,656,546 | 4/1987 | Mallory | 360/110 |
| 4,663,685 | 5/1987 | Tsang | 360/113 |
| 4,681,813 | 7/1987 | Yamada et al. | 428/450 |
| 4,703,382 | 10/1987 | Schewe et al. | 360/125 |
| 4,703,383 | 10/1987 | Katou et al. | 360/126 |
| 4,714,668 | 12/1987 | Uneno et al. | 430/316 |
| 4,716,484 | 12/1987 | Kaminaka et al. | 360/125 |
| 4,731,683 | 3/1988 | Otomo et al. | 360/119 |
| 4,734,802 | 3/1988 | Higuchi et al. | 360/103 |
| 4,738,021 | 4/1988 | McClure | 29/603 |
| 4,742,413 | 5/1988 | Schewe | 360/126 |
| 4,743,988 | 5/1988 | Sato et al. | 360/126 |
| 4,745,506 | 5/1988 | Nakamura et al. | 360/123 |
| 4,751,599 | 6/1988 | Katou | 360/126 |
| 4,752,555 | 6/1988 | Takada et al. | 430/314 |
| 4,758,903 | 7/1988 | Noguchi et al. | 360/118 |
| 4,774,616 | 9/1988 | Kumasaka et al. | 360/118 |
| 4,779,486 | 10/1988 | Schumacher | 74/675 |
| 4,782,416 | 11/1988 | Hillenbrand et al. | 360/125 |
| 4,784,015 | 11/1988 | Schumacher | 74/640 |
| 4,789,910 | 12/1988 | Otsuka et al. | 360/113 |
| 4,791,719 | 12/1988 | Kobayashi et al. | 29/603 |
| 4,796,127 | 1/1989 | Wada et al. | 360/103 |
| 4,803,580 | 2/1989 | Mowry | 360/113 |
| 4,804,016 | 2/1989 | Novacek et al. | 137/625.23 |
| 4,804,816 | 2/1989 | Hata | 219/121.2 |
| 4,807,076 | 2/1989 | Nakashima et al. | 360/126 |
| 4,819,111 | 4/1989 | Keel et al. | 360/125 |
| 4,821,133 | 4/1989 | Mowry et al. | 360/113 |
| 4,837,924 | 6/1989 | Lazzari | 29/603 |
| 4,841,398 | 6/1989 | Mowry | 360/113 |
| 4,841,402 | 6/1989 | Imanaka et al. | 360/126 |
| 4,843,507 | 6/1989 | Schewe et al. | 360/125 |
| 4,853,815 | 8/1989 | Diepers | 360/126 |
| 4,875,987 | 10/1989 | Wada et al. | 29/603 |
| 4,891,303 | 1/1990 | Garza et al. | 430/312 |
| 4,891,725 | 1/1990 | Mowry | 360/113 |
| 4,898,804 | 2/1990 | Rauschenbach et al. | 430/311 |
| 4,914,868 | 4/1990 | Church et al. | 29/603 |
| 4,935,832 | 6/1990 | Das et al. | 360/112 |
| 4,942,486 | 7/1990 | Kutaragi et al. | 360/48 |
| 4,943,883 | 7/1990 | Sano et al. | 360/126 |
| 4,970,616 | 11/1990 | Ramaswamy | 360/122 |
| 5,012,375 | 4/1991 | Nishimura | 360/119 |
| 5,040,087 | 8/1991 | Lee | 360/121 |
| 5,079,657 | 1/1992 | Arnoff et al. | 360/103 |
| 5,137,750 | 8/1992 | Amin et al. | 360/119 |
| 5,181,152 | 1/1993 | Yan et al. | 360/122 |
| 5,267,112 | 11/1993 | Batra et al. | 360/119 |
| 5,452,166 | 9/1995 | Arnoff et al. | 360/126 |

OTHER PUBLICATIONS

J.C. Mallison, "Gap Irregularity Effects in Tape Recording", *IEEE Transactions of Magnetics*, vol. 5, p. 71 (1969).

Aronoff, et al., "Sidewriting Can Create Error Immunity For Disk Drive Designers", *Computer Technology Review*, Fall 1987.

Chang, et al., "Thin Film Floppy Disk Head", *IEEE Transactions on Magnetics*, vol. 22, No. 5, Sep. 1986, pp. 695–697.

Feng, "Spin Stand Measurements of Write and Erase Widths", *IBM Technical Report*, TR02.1610, Dec. 1989, pp. AA–3.

Feng, "Spin Stand Measurements of Write and Erase Widths", *Unknown*, pp. 1–9.

Jones, et al., "Laminated Multi–Turn Magnetic Head", *IBM Technical Disclosure*, vol. 15, No. 7, pp. 2185–2186 (Dec. '72).

T.A. Roscamp, et al., "Thin Film Magnetic Heads Excel in Packing and Moving Data", reprinted from *Electronics*, Mar. 3, 1977, 8 pp.

D.A. Thompson, et al., "Film Head Development", *IBM Disk Storage Technology*, Feb. 1980, pp. 3–12.

J.L. Su, et al., "Side Fringing of Thin Film Heads With Pole Trimming", *IBM Research Division (IBM Magnetic Recording Institute/IBM General Products Division)*, 10 pp. date unknown.

Applied Magnetics Magnetic Head Division, Thin Film Status Report "Years Of R&D Now Culminating In Advanced Head Products", *Magnetic Head–Lines*, goleta, CA, Special N.C.C. Edition, Jun. 1979, pp. 1.4.

Applied Magnetics Corporation, "Single–Crystal Extends Life of Ferrite Technology", *Magnetic Head–Lines*, Goleta, CA, Special COMDEX Edition, Nov. 1990, pp. 1.5.8.

Hisashi, et al., "Submicron–Trackwidth Inductive/Mr Composite Head", *IEEE Transactions on Magnetics*, vol. 27, No. 6, Nov. 1991, pp. 4678–4683.

THIN FILM MAGNETIC RECORDING HEAD FOR MINIMIZING UNDERSHOOTS

This application is a continuation of U.S. patent application Ser. No. 08/514,760, filed Aug. 14, 1995, which was a divisional of U.S. patent application Ser. No. 08/130,285, filed Oct. 1, 1993, issued as U.S. Pat. No. 5,452,166.

FIELD OF THE INVENTION

The present invention relates to thin film magnetic heads used to read and write data onto magnetic media, and more particularly to an improved head geometry and manufacturing process for reducing undershoots and for quickly trimming tracks on thin film magnetic heads.

BACKGROUND OF THE INVENTION

Thin film magnetic recording heads have gained wide acceptance in the data storage industry. Due to their small size, thin film magnetic heads are ideal for recording data onto narrow tracks; thereby increasing the total data storage capacity of a magnetic medium such as a disk or a tape.

Typically, a thin film magnetic head is produced by laminating one or more layers of thin magnetic film onto a substrate. These films are usually on the order of 2–4 microns thick, although thinner and thicker films are sometimes produced. During the manufacturing process, a substrate (made of Ni—Zn ferrite or Alumina, for example) is precision machined to desired specifications. Alternating layers of conductive and insulating materials are then deposited onto the substrate by means of evaporation, sputtering, plating, or some other deposition means, which allows for precise control of the deposition thickness. Etching, ion milling or other means are used to shape and form the deposited layers so that the desired configuration of each layer is provided. For details relating to the general manufacturing process used to produce thin film magnetic recording heads see a book entitled *Handbook of Thin Film Deposition Processes & Techniques: Principles, Methods, Equipment & Applications* edited by Klaus Schuegraf, and published in 1989 by Noyes Press, which is hereby incorporated by reference.

A completed magnetic head typically includes two conductive layers, called poles, separated by an insulating layer. The poles are conductively connected at one end so that the overall configuration of the poles is annular, somewhat like that of a horseshoe. Conductive wires or strips are embedded within the insulating layer between the poles. The insulating layer is typically narrowest (e.g., on the order of 0.5 microns) near the tips of the poles (i.e., at the end where the poles are not conductively connected). The portion of the insulating layer near the pole tips is called the front gap (or, as often referred to hereinafter, simply the gap), and the thickness of the insulating layer between the pole tips is called the gap length. Typically, the substrate on which the layers have been deposited is formed into a slider defining one or more air bearing surfaces. The portion of the insulating layer near the region where the poles are conductively connected is called the rear gap. Once the entire head has been completed, the head is mounted onto a suspension assembly, which supports the head in a desired position relative a magnetic medium.

During write operation of the head, electrical current flows through the conductive strips, which induces a magnetic field or flux within the poles. The magnetic flux flows in a circuit through the poles, but is impeded by the discontinuity at the gap. Due to the discontinuity at the gap, the magnetic field protrudes out into the regions proximate to the gap. It is this protruding portion of the magnetic field that is used to record data onto magnetic media.

A magnetic medium typically includes magnetic dipoles, which may be oriented by means of a sufficiently strong magnetic field. As the magnetic medium (e.g., a tape or disk) moves past the pole tips of the recording head, flux protruding from the gap region interferes with the magnetic medium. In this way, variations in the magnetic flux cause variations in dipole orientation along the length of the magnetic medium. These variations in the magnetic medium constitute retrievable information.

In applications where it is desirable to store digital information, the information recorded onto a magnetic medium is designated as either a "1" or a "0". To record a bit as a one, a positive magnetic fluxpulse might be induced, which causes the dipoles to orient in one direction (thereby creating a "positive" magnetic bias in the medium). To record a bit as a zero, a negative flux pulse causes the dipoles to orient in the opposite direction (thereby creating a "negative" magnetic bias in the medium). In high density magnetic storage, it is desirable to generate flux pulses that have a high gradient (that is, pulses that are very steep) so that many pulses can be recorded in close proximity to one another. It is also desirable to produce pulses with an amplitude significantly higher than the expected background noise level, so that a high signal-to-noise ratio (SNR) is obtained. A high amplitude pulse is also desirable because newly recorded data is usually written over old data on a magnetic medium. The technique of writing new data over old data is commonly referred to as "overwrite."

Once a sufficiently strong magnetic bias has been imparted to the magnetic medium by a write head, the information encoded into the magnetic medium may be retrieved by moving the medium past the gap so that magnetic flux produced by the motion of the magnetic medium induces current to flow in the coil windings. The current produced by the motion of the medium past the head typically takes the form of electrical pulses. The amplitude of these pulses is detected within a predetermined time period, or window, and, depending upon the detected amplitude of the pulse, the pulse is designated as a digital 1 or 0.

In current high-frequency, high-density, recording systems, timing is critical since only a small time window (e.g., 15 nanoseconds) is allotted for the detection of a pulse. If a pulse is shifted in time or distorted in amplitude, the pulse may not be detected within the allotted window or may be distorted to such a degree that the amplitude of the pulse is ambiguous. Thus, it is essential that the morphology of the data pulse be accurately detected to prevent time shifts or amplitude distortions.

FIG. 1 shows a plot of magnetic field strength of an exemplary positive flux pulse 20 versus time, observed when a magnetic tape or other magnetic medium passes near the recording head gap. As shown in FIG. 1, the pulse 20 has a main, high amplitude component 25, Ks well as leading and trailing negative undershoot components 30, 32. The undershoot components 30, 32 are produced when the edges of the leading and trailing poles of the recording head detect fringe fields from the magnetic medium, while the main high amplitude component is produced by the strong magnetic field present adjacent to the gap. It has been found that the undershoot components tend to distort the amplitude of the main read pulse 25, thereby contributing to background noise. In addition, the leading and trailing undershoots 30, 32 play a major role in peak-shift (that is, a time shifting of the main high amplitude component of the detected data pulse). Background noise interference and peak-shift may severely compromise the quality of detected data. Thus, it is important to minimize the effects due to these undershoots.

The physical geometry of the recording head may be altered to produce changes in the morphology of the flux pulse detected by the recording head. However, current methods of producing magnetic recording heads have several serious limitations with respect to their ability to control the physical geometry of the recording heads. Furthermore, the tolerances achievable by current techniques are unacceptable for purposes of accurately shaping the recording heads to a desired configuration in many applications.

SUMMARY OF THE INVENTION

One aspect of the present invention is an inductive magnetic head for reading a magnetic media having a primary direction of motion (as defined below) including a first pole layer, a second pole layer, and a gap layer. As will be appreciated by those of skill in the art, the angular position of the leading edge of the first pole tip relative to the primary direction of motion will vary for heads mounted on a suspension arm which pivots about an axis. Generally, such systems are designed so that the trailing edge of the first or leading pole of the head and the back end of the slider, if any, is perpendicular to the primary direction of motion of the magnetic media in at least one position during the read process. This position is a position of zero skew angle. (Linear systems are usually designed to always have a zero skew angle). In the magnetic head of the present invention, the first pole layer defines a first or leading pole tip having a leading edge and a trailing edge, wherein the majority of the leading edge of the first pole tip has a non-zero slope with respect to the trailing edge of the first pole tip and, desirably, to a line perpendicular to the primary direction of motion throughout the operative range of motion of the head. The second pole layer defines a second or trailing pole tip having a leading edge and a trailing edge, wherein the leading edge of the second pole tip is parallel to the trailing edge of the first pole tip. A gap layer is positioned between the trailing edge of the first pole tip and the leading edge of the second pole tip. Desirably, substantially all of the leading edge of the first pole tip has a non-zero slope with respect to the trailing edge of the first pole tip and, preferably, to a line perpendicular to the primary direction of motion of the magnetic media throughout the operative range of motion of the head. Although not as critical, these characteristics are also applicable to the slope of the trailing edge of the second pole tip.

Generally, the entire trailing edge of the first pole tip and the leading edge of the second pole tip will be straight. However, in the event that a portion of such edges are not straight, it will bet understood that what is referred to is the portion of such edges which are adopted to read data.

Advantageously, the first pole tip further includes a first side perpendicular to the trailing edge of the first pole tip and a second side perpendicular to the trailing edge of the first pole tip, and the second pole includes a first side collinear with the first side of the first pole tip and a second side collinear with the second side of the first pole tip. In one embodiment of the invention, the thin film head includes an open trench surrounding the first pole tip and at least one evacuation port for the removal of debris which may collect in the trench.

Another important aspect of the invention is a thin film magnetic head for reading a magnetic media having a primary direction of motion, including a first pole layer, a second pole layer and a gap layer. The first pole layer defines a first pole tip having a leading edge and a trailing edge, wherein the leading edge of the first pole tip is stepped toward the trailing edge of the first pole tip from an adjacent portion of the first pole layer. The second pole defines a second pole tip having a leading edge and a trailing edge, wherein the leading edge of the second pole tip is parallel to the trailing edge of the first pole tip. A gap layer is positioned between the trailing edge of the first pole tip and the leading edge of the second pole tip. Desirably, the trailing edge of the second pole tip is stepped toward the leading edge of the second pole tip from an adjacent portion of the second pole layer. Advantageously, the leading edge of the second pole tip is wider than the trailing portion.

Another important aspect of the invention is a method of reducing undershoots formed by a thin film magnetic head. The method includes depositing a series of layers on a substrate to form a deposition, wherein the series of layers includes a leading pole layer, a gap layer and a trailing pole layer; forming a recess in an end of the deposition around the leading pole layer, the gap layer, and the trailing pole layer to form a leading pole tip and a trailing pole tip; and shaping a leading edge of the leading pole tip in a manner to reduce undershoots. The forming of the recess and the shaping of the leading edge of the leading pole tip are desirably performed simultaneously. Desirably, the trailing edge of the second pole tip is also shaped in a manner to reduce undershoots, and this shaping step is performed simultaneously with the forming of the recess.

Advantageously, the substrate may be formed into a slider having air bearing surfaces. Where it is desirable to etch the air bearing surfaces, the etching of the air bearing surfaces may be performed simultaneously with the shaping of the leading edge of the first pole tip and the trailing edge of the second pole tip.

Yet another important aspect of the invention is a method of reducing undershoots formed by a thin film magnetic head for reading data having a primary direction of motion, comprising the steps of: depositing a series of layers on a substrate to form a deposition including a leading pole layer, a gap layer, and a trailing pole layer; forming a recess in an end of the deposition to form a leading pole tip and a trailing pole tip; and shaping a leading edge of the leading pole tip such that the majority of the leading edge has a non-zero slope with respect to the trailing edge of the leading pole tip and, preferably, to a line perpendicular to the primary direction of motion of the magnetic media throughout the operative range of motion of the head. Advantageously, the forming of the recess and the shaping of the leading edge of the leading pole tip can be performed simultaneously.

A further important aspect of the present invention is a method of reducing undershoots formed by a thin film magnetic head, comprising the steps of: depositing a series of layers on a substrate to form a deposition, including a leading pole layer, gap layer, and a trailing pole layer; forming a recess in an end of the deposition around the leading pole layer, the gap layer, and the trailing pole layer to form a leading pole tip and a trailing pole tip; shaping a leading edge of the leading pole tip in a manner to reduce undershoots; and trimming a pair of sides of the leading pole tip and a pair of sides of the trailing pole tip such that the sides are perpendicular to a trailing edge of the leading pole tip. Advantageously, the shaping of the leading edge of the leading pole tip and the trimming of the pair of sides are performed simultaneously.

BRIEF DESCRIPTION OF THE DRAWINGS

FIG. 4b is a detail of a portion of FIG. 4a.

FIG. 6b is a side cross sectional view of the pole tip assembly depicted in FIG. 6a.

FIG. 7a is an enlarged perspective view of an alternative embodiment of the pole tip assembly of FIG. 6a.

FIG. 7b is a side cross sectional view of the pole tip assembly depicted in FIG. 7a.

DETAILED DESCRIPTION OF THE INVENTION

Figure 1:
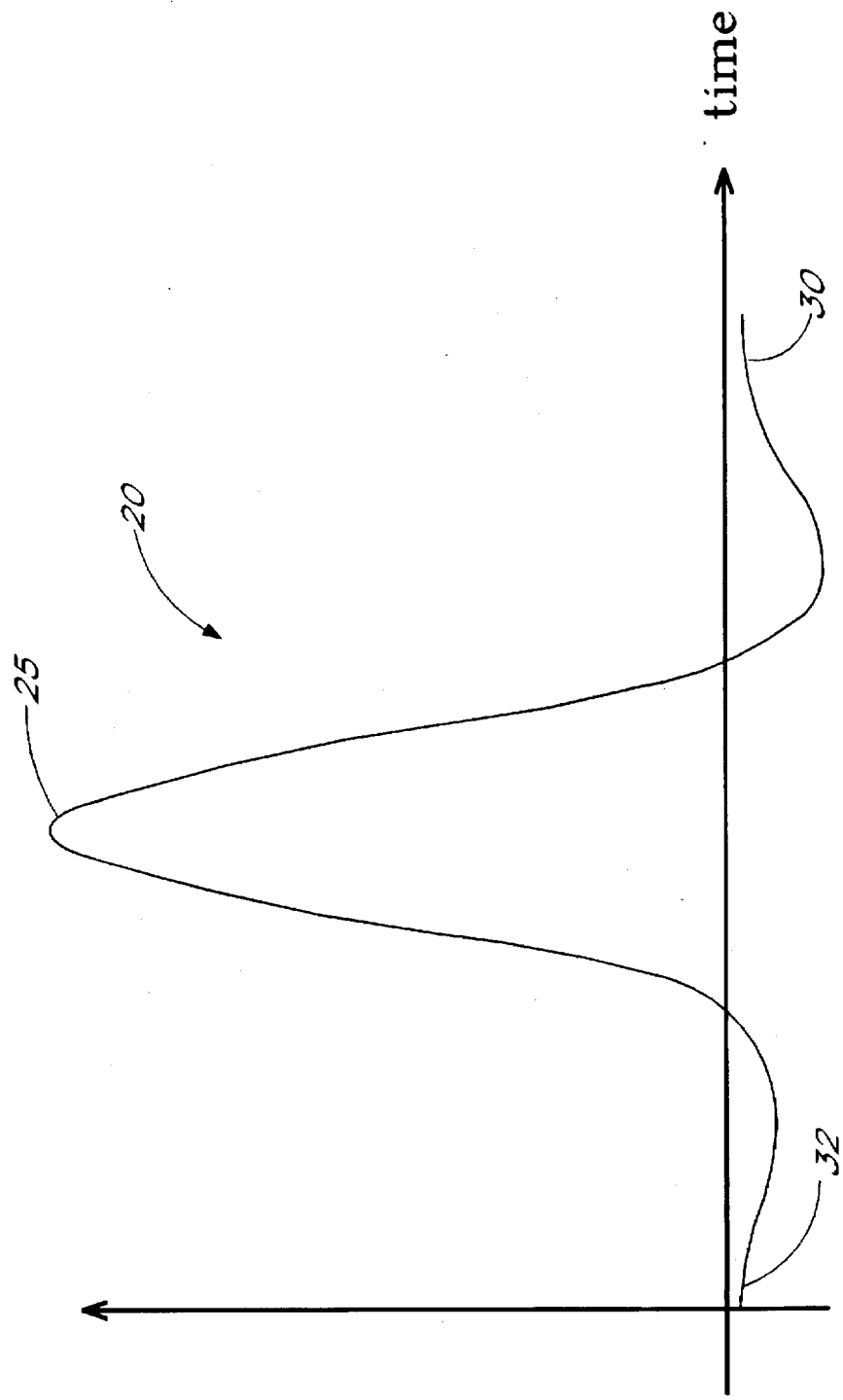
FIG. 1 graphically depicts a typical current pulse detected when a thin film magnetic head reads data from a magnetic medium.
Figure 2:
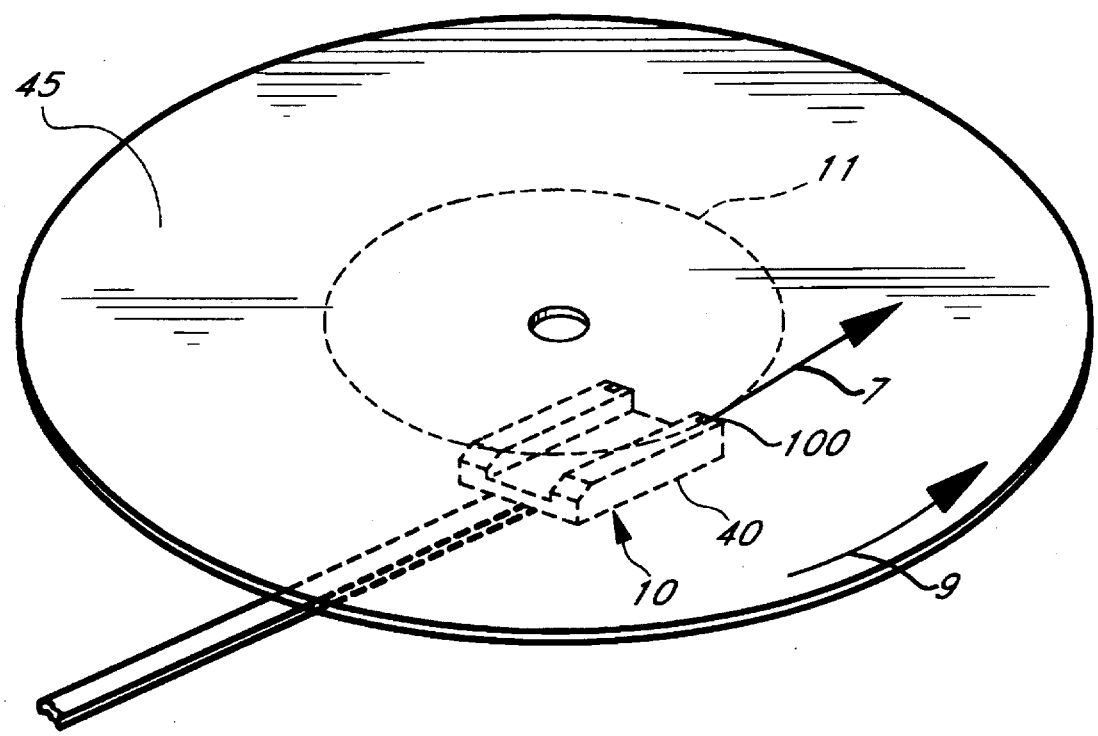
FIG. 2 is a perspective view which depicts a magnetic recording head flying over a magnetic disk.

FIG. 2 is a perspective view which depicts a magnetic recording head 10 (shown in phantom), including a slider 40 and a pair of transducers or sensors 100 (only one of which is operative), flying adjacent to a magnetic disk 45. The magnetic disk 45 moves in a primary direction of motion 7 as indicated by the arrow shown in FIG. 2. Although the disk 45 rotates about its center point in a direction 9 as indicated by the curved arrow in FIG. 2, the relative size of the sensor 100 of the thin film head 10 to the disk 45 makes the motion of the portion of the circular data track 11 from which data is being read as it moves past the sensor 100 appear substantially linear. It is thus the direction of the linear velocity component of the magnetic media (in this case, in a direction tangent to the circular data track of the magnetic media), at the point where the operative sensor 100 is over the disk 45 which defines the primary direction of motion of the magnetic media.

Figure 3:
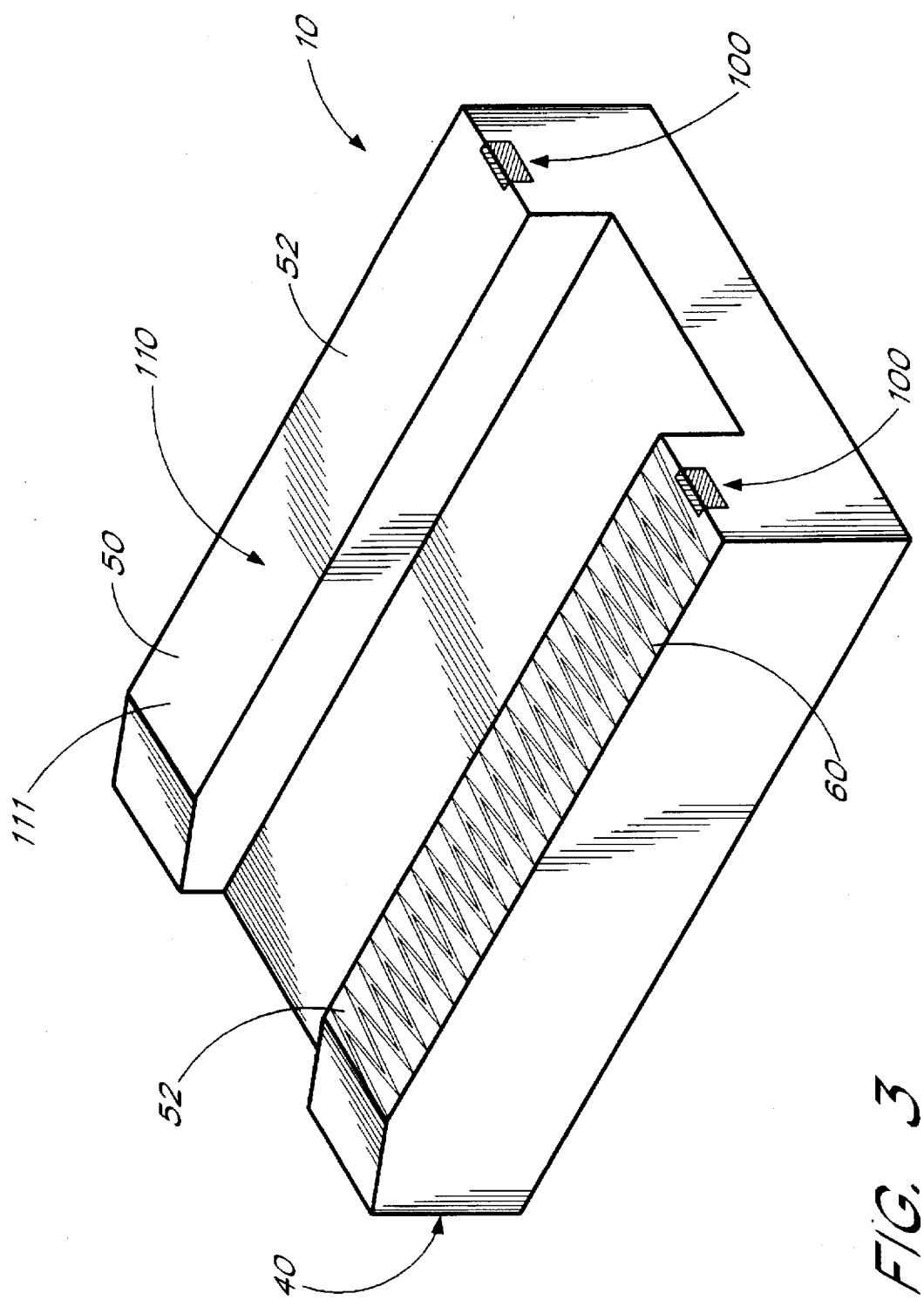
FIG. 3 is a perspective view of the slider of the magnetic recording head shown in FIG. 2 which shows the air bearing surface on the bottom side of the slider in detail.

Referring to FIG. 3, the slider 40 includes a pair of air bearing rails 50, each of which defines an air bearing surface 52. The small thin film magnetic recording sensors 100 are deposited onto the rear end of each of the rails 50. The recording sensors 100 are shown in greater detail in FIGS. 4a, 4b, 5 and 6a below. A support arm 55 attaches to the slider 40 and extends to a mechanical positioning member (not shown) as well understood in the art.

The air bearing surfaces 52 form a portion of the air bearing sensor face 110 of the slider 40 (i.e., the face of the slider adapted to face the magnetic media during use including, but not limited to, the air bearing surfaces 52) in greater detail. The air bearing surfaces 52 of the slider 40 may define a pattern 60 for decreasing the stiction of the air bearing surface of the slider 40 (although only one of the rails is illustrated with a pattern). The pattern 60 is provided for illustrative purposes only and may not correspond to any actual pattern etched onto an air bearing surface. The pattern 60 is typically-etched onto the air bearing surface by means of conventional ion milling techniques, or the like.

Figure 4A:
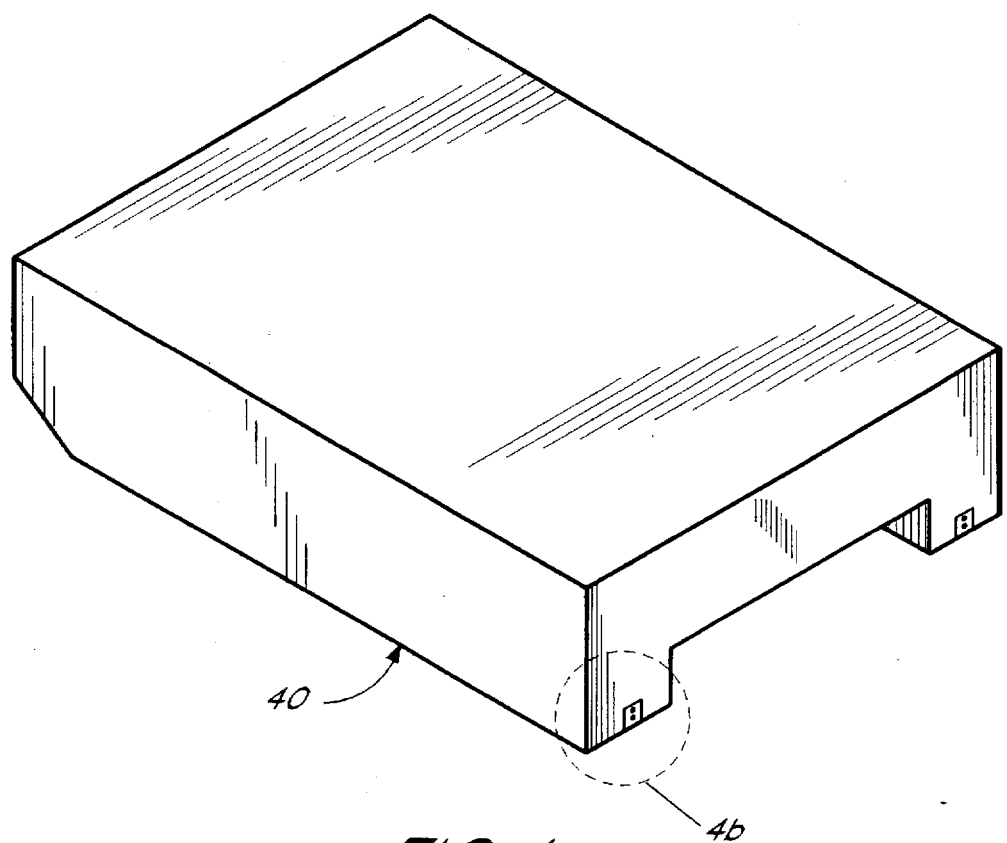
FIG. 4a is an enlarged perspective view of the transducer of the magnetic recording head of FIGS. 2 and 3, and constructed in accordance with the teachings of the present invention.
Figure 4B:
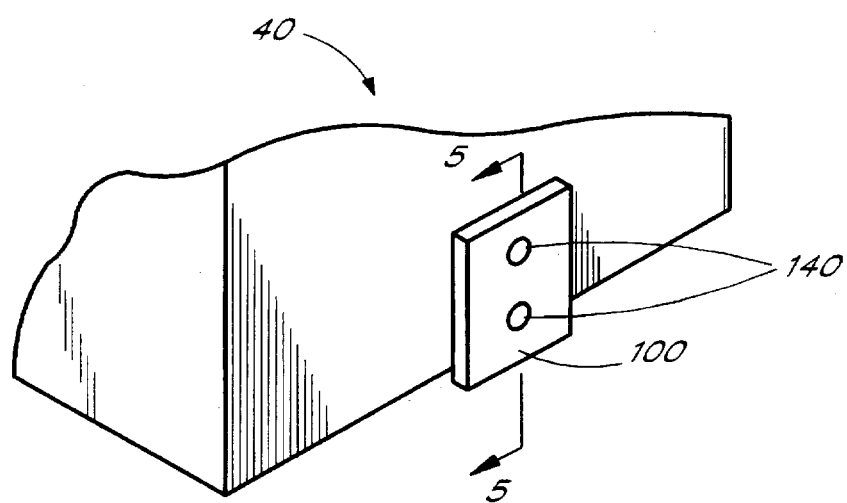

FIGS. 4a and 4b are enlarged perspective views of the thin film magnetic recording head sensor 100 on the back portion of the slider 40 of FIGS. 2 and 3, and constructed in accordance with the teachings of the present invention. During read or write operations, a magnetic medium, such as the disk 45, passes across an air bearing sensor face 111 (FIG. 6a) of the sensor, as indicated by the arrow in FIG. 2. As illustrated, the air bearing sensor face 111 of the sensor 100 forms a small portion of both the air bearing surface 52 and air bearing surface of the head. A specially fabricated pole tip structure 115 (see FIG. 6a) writes data onto, and reads data from, a data track on the magnetic disk 45 (see FIG. 2), as is well understood in the art. Referring again to FIGS. 4a and 4b, the sensor of the head 100 includes bonding pads 140. Fine, conductive wires (not shown) are bonded onto the pads 140 to form an electrical connection between conductive coils within the thin film head 100 and the external wires.

Figure 5:
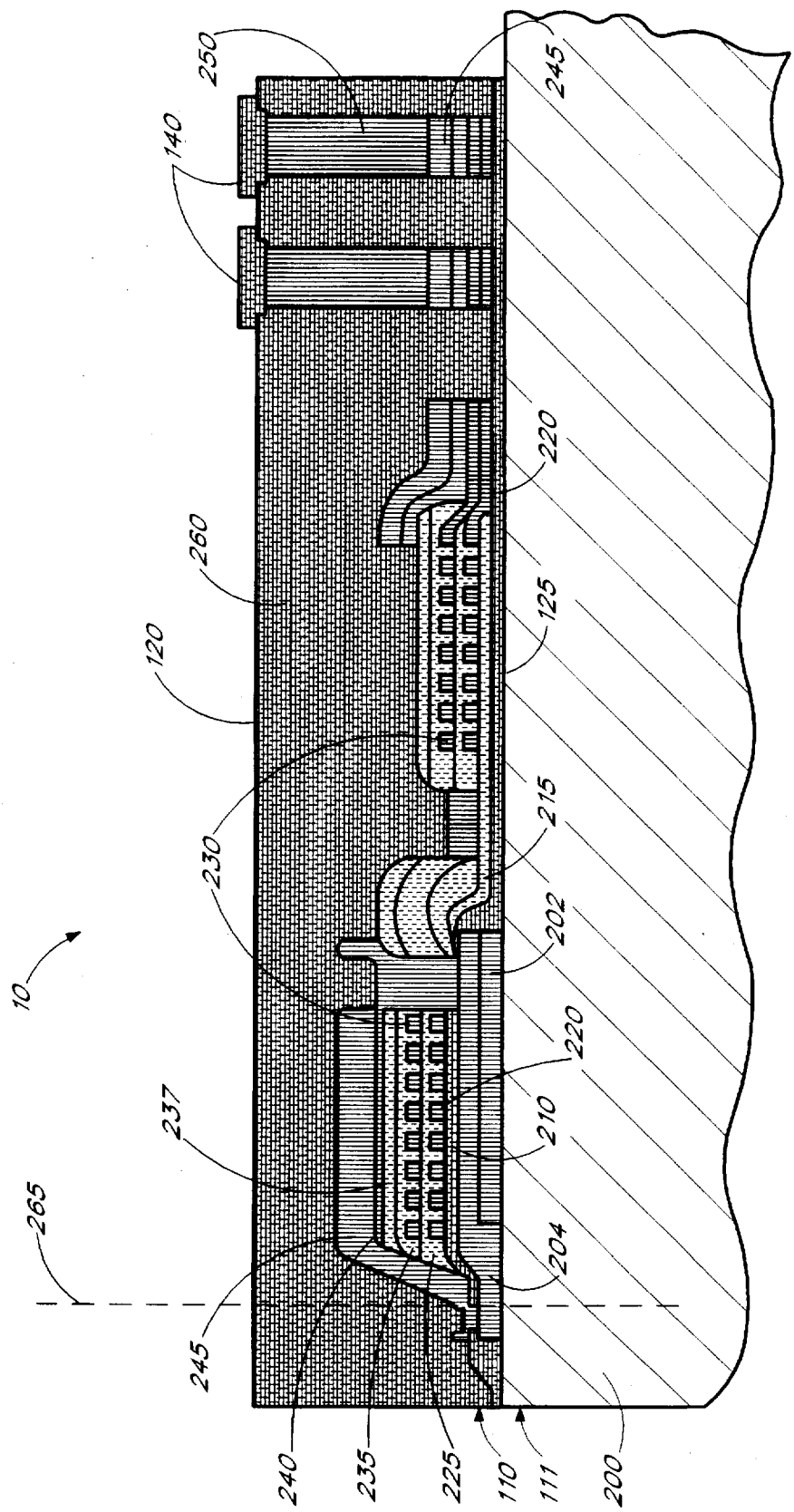
FIG. 5 is a cross-sectional elevational view of the transducer taken along the line 5—5 of FIG. 4a, which details the different thin film layers used to manufacture the recording head of FIG. 2.

The cross-sectional view of FIG. 5 shows the different material layers used to fabricate the thin film magnetic sensor 100. It should be understood, however, that the material from which each of the layers is composed, as well as the relative order and number of the layers depicted in FIG. 5, are merely exemplary and do not necessarily represent a standard structure of all thin film magnetic heads constructed in accordance with the present invention. In practice, the layer materials, the number of layers, and the relative position of the layers may vary widely from application to application depending upon the specific parameters of a given application.

The thin film magnetic head 10 is formed by a substrate 200 (which is later shaped to form the slider 40) and a series of deposition layers which form the sensor 100. A first anti-saturation permalloy layer 202 and a second permalloy layer 204 which acts as the leading pole are deposited on the substrate 200. A gap layer 210 is then deposited over the permalloy layer 204 and a baked photoresist layer 205 is subsequently deposited over portions of the gap layer 210. Conductive winding layers 220, 230 are alternately deposited between baked photoresist insulating layers 225, 235, 237. The conductive layers 220, 230 may be composed of a material such as copper or some other electrically conductive material. An anti-saturation permalloy layer 240 is deposited over portions of the baked photoresist layer 237, and a second permalloy pole layer 245 is deposited over the anti-saturation layer 240. The permalloy layer 245 acts as the second, or trailing pole of the thin film recording sensor 100. A thick conducting cooper layer 250 is deposited over the permalloy layer 245 to provide conductive contacts with the bonding pads 140, which may, for example, be made of gold or some other highly conductive, oxidation resistant material. Finally, the layers are encapsulated within an insulating material layer 260, which may, for example, comprise alumina. The entire assembly is then lapped on the air bearing face 110 until the desired throat height is obtained, and the desired air bearing surface is formed, as is well understood in the art.

The dashed line 265 designates the portion of the deposition and substrate which is to be lapped away to form the magnetic head 10 in one exemplary embodiment. The lapping process is precision controlled to achieve the desired inside and outside throat height. The inside throat height is defined as the distance from the front end of the pole tip at the front gap (i.e., the face surface) to the opposite end of the front gap defined by the location where at least one of the pole layers separates from the gap layer. The outside throat height is defined as the distance from the pole tip to the point where the exterior surface of one pole is nonparallel to the adjoining planar surfaces of the gap layer and the other pole layer.

Each of the layers depicted in FIG. 5 may be selectively configured using photo-barrier masking and ion beam or other etching techniques. Although such techniques are well understood in the art, and a description of some of the more common masking and etching techniques is provided in the above referenced text by Schuegraf, a brief description of one method of depositing and configuring the thin film layers shown in FIG. 5 is provided herein.

A plurality of thin film heads are formed on a generally circular wafer, such as an alumina titanium carbide wafer, as is well known in the art. First, a plating base (not shown) is deposited onto the wafer to act as a cathode and seed layer for electroplating of the leading pole 204 and the first anti-saturation layer 202. For thin film heads having permalloy poles 204, 245, an approximately 1000 angstrom thick layer or permalloy is typically deposited to form the thickness of each pole. The wafer is coated with photoresist, which is baked, rinsed and spun dry. The photoresist is covered with a mask having portions which are substantially insensitive to ultraviolet (UV) light. The photoresist is subsequently exposed to UV light. The exposed photoresist is developed and removed, such that a photoresist mask having a plurality of frames is formed.

The first anti-saturation permalloy layer 202 is then deposited over the surface of the wafer using the well known technique of electroplating, for example. As is well known in the art, the permalloy layers will not adhere to photoresist frames. However, permalloy material does adhere to the exposed plating base between each of the frames. The photoresist layer is then removed using conventional methods (e.g., a chemical wash) to leave the anti-saturation layer 202 in the desired configuration. The permalloy layer 204, together with the first anti-saturation permalloy layer 202, in combination form the leading pole. Any excess permalloy material which is not used to form the leading pole may be removed by coating the wafer with a photoresist mask which is soft-baked, rinsed and spun dry. The photoresist mask covers the layers 204, 202 to protect these layers. The entire wafer is then placed in a chemical bath to etch away the excess permalloy material.

Once the proper configuration of the leading pole is obtained, a layer of magnetically inactive material, such as alumina, is sputter deposited over the permalloy layer 204 to form the gap layer 210. To achieve the desired configuration of the gap layer 210, an ion milling or etching process is typically performed by covering the gap layer 210 with a photoresist material having frames formed in the manner described above. Those portions of the gap layer 210 which are not protected by the photoresist layer are etched away in the ion milling process to achieve the desired configuration of the gap insulating layer 210. Subsequent alternating insulating layers 215, 225, 235, 237 are deposited between layers of current conducting coils 220, 230 in a spiral form according to well known methods so that the conducting coils 220, 230 are embedded within the insulating layers 215, 225, 235, 237. The final anti-saturation and pole layers 240, 245 are configured in much the same way as the layers 202, 204 (i.e., employing the photo-masking methods described above).

Once the entire wafer is encapsulated with the insulating alumina layer 260, and the bonding pads 140 are formed, then the wafer is sliced into rows and lapped to yield a plurality of recessed pole thin film magnetic recording heads 100. Lapping of the air bearing face 110 forms a slider or air-bearing surface. Thus, when the air bearing sensor face 111 (FIG. 6a) of the sensor 100 flies over the recording medium, the pole tip assembly 115, which comprises the exposed portion of the pole layer 204, the gap layer 210 and the pole layer 245, is close to the recording medium 45 (see FIG. 2).

Figure 6A:
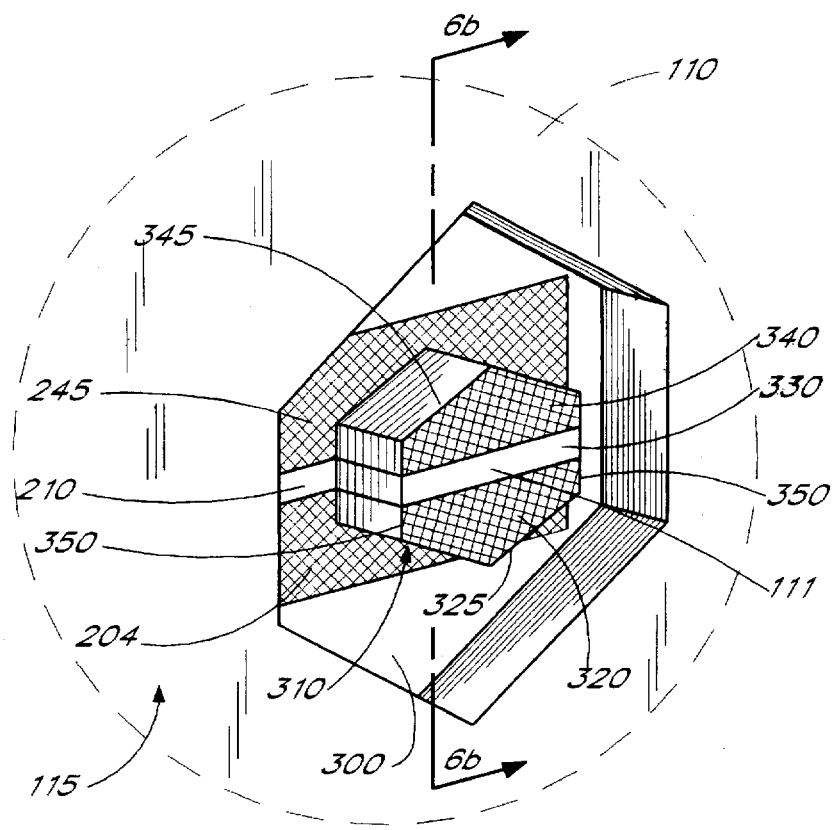
FIG. 6a is an enlarged perspective view of a pole tip assembly of the transducer of FIG. 4a, which has an improved geometry as manufactured in accordance with the teachings of the present invention.
Figure 6B:
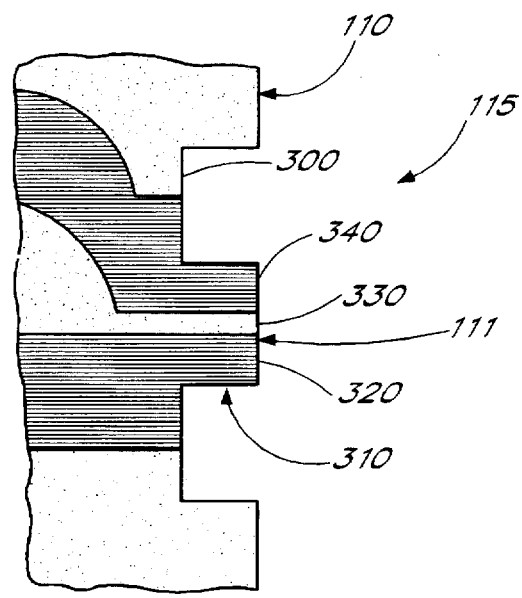

FIG. 6a is an enlarged perspective view which shows one embodiment of an improved head geometry configured and manufactured in accordance with the teachings of the present invention, while FIG. 6b is a side cross-sectional view of the pole tip assembly 115 depicted in FIG. 6a. In the embodiment shown in FIG. 6a, the pole tip assembly 115 is generally formed in a dual hexagonal configuration. Specifically, a hexagonal trench 300 having three pairs of parallel, approximately equal, sides are formed in the air bearing sensor face 111 of the thin film magnetic recording sensor 100. The approximate depth of the trench 300 (i.e., the distance between the surface of the trench 300 and the air bearing sensor face 111 of the sensor 100) is approximately 0.5 to 1.5 micron, as determined by the desired application. At the center of the trench 300, a hexagonal raised portion 310 remains. The raised portion 310 includes a leading pole tip portion 320 having a leading edge 325, a trailing pole tip portion 340 having a trailing edge 345, and a raised gap portion 330 which lies flush with the raised pole tips 320, 340. The raised portion 310 further includes side edges 350 which, as will be discussed in greater detail below, define the boundaries of the track width. As shown in FIG. 6a, the entire surface of the remaining raised portion 310 is flush with the face 111 of the sensor 100 surrounding the trench 300. Likewise, the air bearing face 110 of the slider 40 is flush with the air bearing sensor face 110 of the sensor, thereby protecting the raised portion 310 from damage. In one particular embodiment, the sides of the hexagonal raised portion 310 are respectively parallel to corresponding sides of the edges of the trench 300.

In a particularly advantageous embodiment, the hexagonal raised portion 310 is oriented such that the plane of the gap layer 210 is perpendicular to the parallel planes defined by two of the parallel sides of the hexagonal raised portion 310. This advantageous configuration, shown in FIG. 6a, allows for a greater tolerance margin in shaping the hexagonal raised portion 310. Specifically, there are two ways in which the pole tip configuration might be misaligned. First, the pole tips may be horizontally displaced from one another. That is, the trailing pole tip 340 may not be situated directly over the leading pole tip 320, but may be displaced slightly to the left or to the right of the leading pole 320. By trimming the sides of the pole tips to form the substantially vertical sides 350, misaligned portions of the pole tips 320, 340 are trimmed away.

The second way in which the pole tip configuration might be misaligned is vertically. That is, the raised portion 310 may be formed such that the gap layer 210 will not fall symmetrically in the middle of the pole tips 320, 340, but will rather fall closer to the leading edge 325 of the leading pole 320 or closer to the trailing edge 345 of the trailing pole 340. In practice, due to inaccuracies in the manufacturing process, the raised portion 310 may be manufactured so that the raised gap portion 330 is near the bottom or the top of the edges 350 (i.e., so that the pole tip 340 constitutes a greater area of the figure delineated by the surface of the raised portion 310 than the pole tip 320, or vice-versa).

In order to maximize read performance of the sensor 100, it is preferable to keep the width of the pole tip 320 where the pole tip 320 is contiguous with the gap portion 330 equal to the width of the pole tip 340 where the pole tip 340 is contiguous with the gap portion 330. Furthermore, in accordance with the present invention, it is desirable to configure the pole tips 320, 340 so that the width of the pole tips does not exceed the track width defined by the width of the raised gap portion 330. In order to insure that these conditions are met, the raised portion 310 is manufactured so that the gap portion 330 falls within a substantially constant width region of the raised portion 330. In this way manufacturing inaccuracies resulting in a slight misalignment of the elements of the raised portion 310 will not significantly affect the read performance of the recording sensor 100.

In accordance with the teachings of the present invention, the trench 300 is formed by means of end-on ion milling as will be described in greater detail with reference to FIGS. 8a–8c. Briefly, the ion milling process used to form the trench 300 employs a photo-masking technique wherein an ion beam is used to etch the trench 300 into the lapped surface of the sensor 100 while allowing the raised portion 310 to remain unetched. Originally, before the ion milling process is performed and just subsequent to the lapping process used to form the air bearing surface, the leading pole 204, the gap 210, and the trailing pole 245 are entirely flush with the air bearing face 111 of the magnetic sensor 100. However, in accordance with the present invention, a further ion milling process is performed in order to configure the leading and trailing poles 204, 245 as well as the gap 210 into a desired geometry which minimizes pulse undershoots as will be discussed in greater detail below.

As will be appreciated, the leading and trailing poles 204, 245 originally have a substantially rectangular cross section at the region where reading from the magnetic disk 45 is to be performed. As a result of the ion milling, the leading edge of the first or leading pole tip is stepped toward the trailing edge of the leading pole tip from the adjacent portion of the first pole layer. Thus, the first pole tip is stepped inward from the portion of the first pole layer next to and adjoining the first pole tip (i.e., the rectangular shaped portion of the first pole layer seen from the end in FIG. 6a). Likewise, the trailing edge of the second or trailing pole tip is stepped toward the leading edge of the second pole tip from an adjacent portion of the second pole layer. Thus, the portion of the second pole tip is stepped inward from the portion of the second pole layer next to and adjoining the second pole tip (i.e., the rectangular shaped portion of the second pole layer seen from the end in FIG. 6a). By end-on ion milling the face 111 of the magnetic sensor 100 into a hexagonal shape which falls within the originally defined rectangular pole configuration (i.e., the configuration depicted in FIG. 6a), several advantages accrue.

An important advantage which accrues from this method of manufacture is precise controlling of the track width. As rule of thumb generally understood in the art, the photo lithography accuracy for tolerances of feature dimensions formed by ion milling is approximately ten percent (10%) of the height of the photo-barrier used during the ion milling process. This is because the features are formed in the photo-barrier by focusing light into a pattern image, thereby developing portions of the photo-barrier to provide the desired pattern. Since the light used to develop the photo-barrier has a focal plane of infinitesimal thickness, those portions of the photo-barrier which are not in the focal plane are developed by slightly blurred, or out of focus images. The farther away the portion of the photoresist barrier is from the focal plane of the image, the greater the blurring of the image used to develop that portion of the photo barrier. Thus, photo-barriers of greater thickness require greater tolerance margins, and provide etching masks that are less accurate.

It is a key aspect of the present invention that very thin photo-barrier layers are required to produce the improved head geometry of the thin film recording sensor 100. In high frequency data reading and writing applications, the depth of the trench 300 need only be on the order of 1 micron to avoid detection of fringe magnetic fields by the recessed rectangular portions of the poles 204 and 245. This is because the sensitivity of head output voltage v varies as:

$$V \alpha \text{ext}(-2\pi s x/v)$$

where s represents the frequency, x represents the trench depth, and v is the head media velocity. Therefore, the head voltage diminishes as the frequency of the magnetic flux increases so that with high frequency data recording, such shallow trench depths are feasible.

Because the depth of the trench 300 is typically to be less than 2 micrometers, the photo-barrier employed in milling the trench will also be less than 2 micrometers as is well understood in the art. Therefore, better than a 0.2 micrometer, track width accuracy is obtainable using the methods of the present invention. Prior track trim methods were incapable of providing such track width accuracy since these methods typically track trim by ion beam etching from the top surface 120 (see FIG. 7a) of the magnetic recording 100 so that in order to track trim the magnetic head the thickness of the photo-barrier had to be from 15 to 40 micrometers to etch at the desired depth from the top surface 120.

Another important advantage of the method of the present invention increases the throughput rate for track trimming heads significantly since only a maximum of 2 micrometers of etching is required as opposed to 15 to 40 micrometers of etching of current track trimming techniques. Thus, when prior techniques may have taken as 7 or 8 hours to perform the track trimming process, the method of the present invention requires on the order of half an hour to track trim at a greater accuracy.

In addition to the increased track trimming accuracy and speed accrued by means of the present invention, a further significant advantage is provided in accordance with the method of the present invention. Specifically, end-on ion milling of the face 111 of the magnetic sensor 100 (FIGS. 8a–8c) provides increased flexibility for shaping the geometry of the leading and trailing poles 204, 245 about the gap 210. Thus, the present invention allows for various physical configurations of the leading and trailing poles 204, 245. As discussed in the background of the invention, the physical geometry of the leading and trailing poles 204, 245 has a significant effect upon the morphology of the detected read pulse produced as the magnetic medium 45 advances past the gap 210 and the poles 204, 245. By forming the leading pole 204 to have a raised pole tip portion 320 (see FIG. 6a) which is pointed rather than flat at its leading edge 325, and by similarly configuring the trailing pole 245 to have a raised trailing pole tip portion 340 which is pointed rather than flat on the trailing edge 345 of the pole tip 340, and by retaining the gap layer 210 so that the raised gap portion 330 is flush with the raised pole tips 320, 340, a significant decrease in the deleterious effects caused by read pulse undershoots is observed.

More particularly, it has been found that a recording head having a pole tip assembly 115 constructed as shown in FIG. 6a decreases the peak amplitude of the undershoots normally associated with a detected read pulse in conventional inductive magnetic read heads. In addition, it has been found that a pole tip assembly constructed in accordance with the teachings of the present invention significantly decreases the slope, or gradient, of these undershoots. The effects of sloping the leading and trailing edges 325, 345 of the leading and trailing pole tips 320, 340, respectively, are shown graphically in the waveforms depicted in FIGS. 10a and 10b.

Figure 10B:
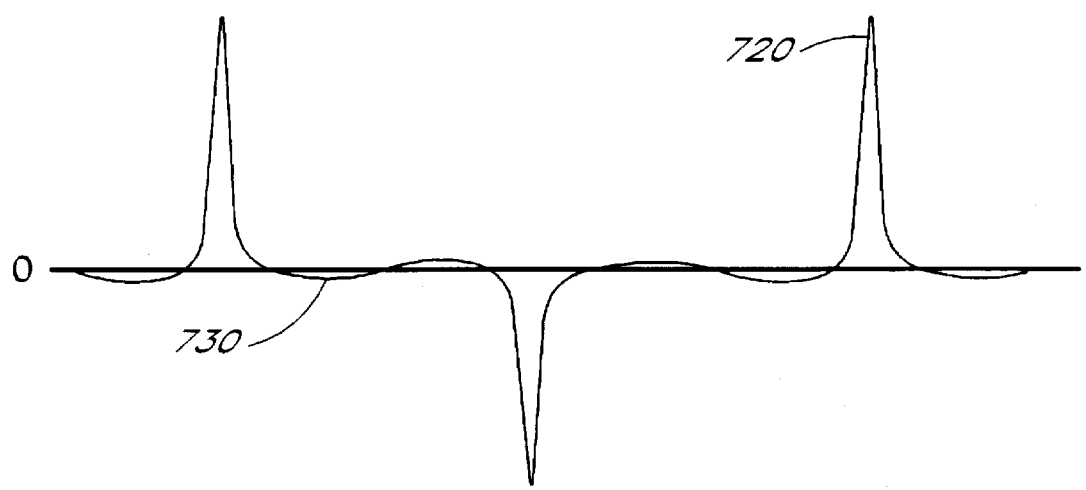
FIGS. 10a and 10b graphically depict typical chains of current pulses when a recording head constructed in accordance with the present invention reads data from a magnetic medium (10b) and when a conventional thin film recording head reads data from a magnetic medium (10a).
Figure 10A:
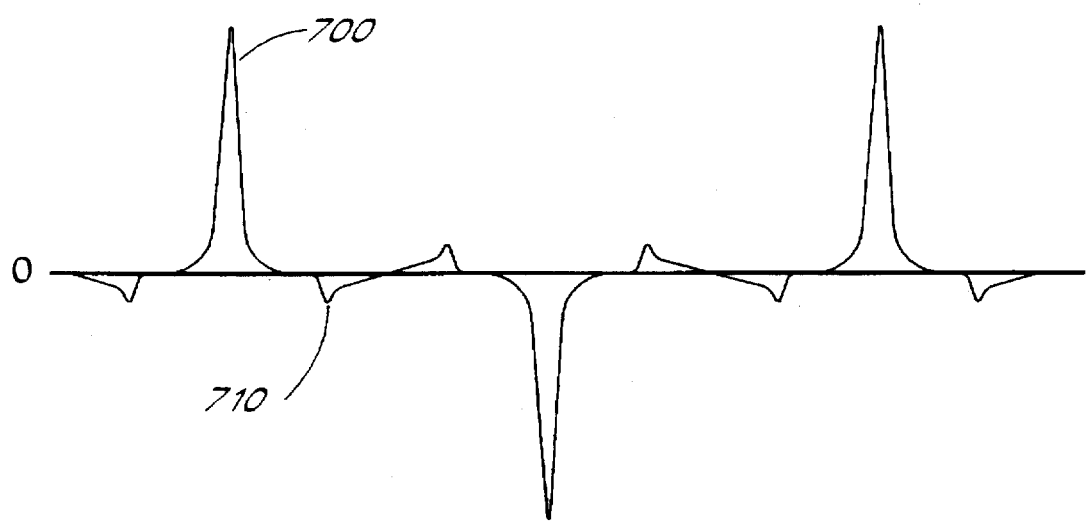

FIG. 10a depicts a chain of read pulses 700 detected by a conventional inductive thin film magnetic recording head wherein the leading and trailing edges of the leading and trailing pole tips are both flat. As can be seen in FIG. 10a, undershoots 710 which flank each side of the main read pulses 700 both have relatively high amplitudes as well as steep gradients. The high amplitudes of the undershoot contribute greatly to amplitude distortion within the main, high-amplitude components of the read pulses, especially as the read pulses 700 are compacted closer and closer together as in high density data storage. In addition, the high gradients of the undershoot pulses 710 contribute greatly to peak shift effects on the main read pulses, thereby resulting in reduced data pulse detection reliability.

FIG. 10b depicts a chain of read pulses 720 which are detected by the read head of the present invention. As can be seen clearly in FIG. 10b, undershoots 730 which flank each of the main read pulses 720 are both low amplitude and low gradient undershoots. Thus, amplitude distortion effects as well as peak shifting effects due to the undershoots 730 are minimized by means of the present invention.

Generally, the reason why the undershoots detected by the read sensor 100 are both low amplitude and low gradient is attributable to the fact that fringe magnetic fields detected at the leading edge 325 of the pole portion 320 are not initially detected across the entire track width, but rather only at the center portion of the magnetically biased data track. This is because the leading edge 325 of the pole tip 320 is slanted with respect to the motion of the magnetic medium 45 past the pole tip assembly 115 to form a gradation in the detecting area of the pole tip 320. As the track moves farther along the air bearing sensor face 111 of the sensor 100, gradually a greater width of the leading edge 350 of the leading pole portion 320 is exposed to the fringing fields so that the amplitude of the undershoots due to these fringing fields increases gradually and not in a sharp pulse. A similar effect is observed on the trailing edge 345 of the trailing pole portion 340 so that a gradual and smooth transition is provided between read pulses and the slopes as well as the amplitudes of the undershoot components are minimized. Of course, it will be appreciated by those skilled in the art that a hexagonal configuration of the pole tip portions 320, 340, although believed to be the most desirable for reasons discussed above, is not the only configuration which allows for a gradual detection of the fringe fields which cause the undershoots. Thus, many other configurations may be contemplated in accordance with the present invention (for example, circular, elliptical, triangular, etc.) and in short, any configuration which does not include wide, flat edges oriented perpendicularly with respect to the primary direction of motion of the disk 45. Such flat edges cause peaks in the undershoot components because the fringe fields due to the magnetic media are detected in large quantities all at once, thereby causing high amplitude and high gradient undershoot pulses.

Figure 11A:
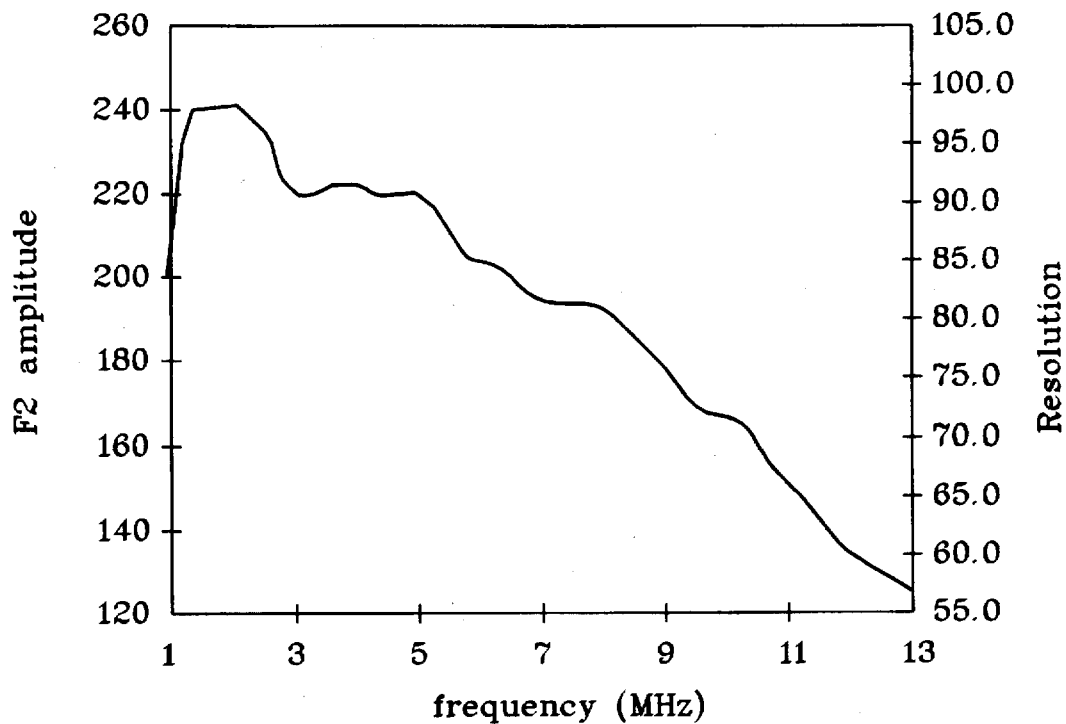
FIGS. 11a and 11b graphically depict the frequency responses of a thin film recording head constructed in accordance with the present invention (11a) and a conventional thin film recording head (11b).
Figure 11B:
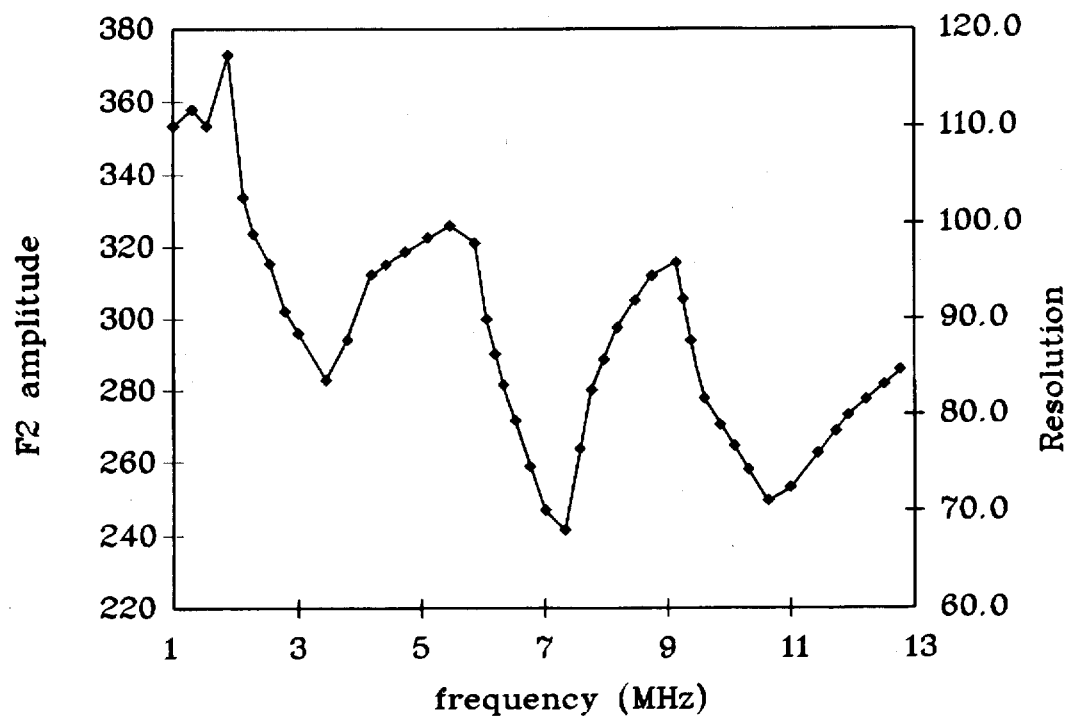

In addition to the amplitude distortion and peak shift problems caused by high amplitude, high gradient undershoot pulses, a further problem is observed in the frequency responses of thin film recording heads which are configured so that they produce such undershoots. Specifically, the frequency response of a thin film magnetic head having high amplitude, high gradient undershoot pulses is highly erratic and compensation therefore is difficult. FIGS. 11a and 11b depict frequency responses of the improved thin film magnetic sensor 100 the present invention, and a conventional thin film magnetic head, respectively. As can be seen from the graphical representation of the frequency response in FIG. 11b, the frequency response of a conventional thin film magnetic head having high amplitude, high gradient undershoot pulses is very erratic and substantially nonlinear so that, for example, at a frequency of 7 MHz the read pulse amplitude is approximately 250 units while at 9 MHz the read pulse amplitude is approximately 310 units, and again at 10 MHz, the read pulse amplitude is again 250 units. Highly erratic frequency responses such as that exhibited by conventional thin film magnetic recording heads are undesirable and generally compensation therefore very difficult to accomplish for during data detection. For example, in order to accurately detect data pulse amplitudes when using conventional thin film read heads it may be necessary to employ a specialized data detection algorithm whereby a normalization factor is applied to the detected pulse amplitude as a function of the frequency of the data detected. The normalization function of frequency would have to be a fairly complex periodic function in order to accurately compensate for the frequency effects due to the high amplitude, high gradient undershoot pulses associated with conventional thin film magnetic read heads.

In contrast, the thin film magnetic sensor of the present invention provides a substantially linear frequency response as shown in FIG. 11a. In order to normalize read pulse amplitudes for the thin film magnetic sensor of the present invention, a relatively simple linear normalization function might be employed, such as those produced by simple high pass filters. Thus, the improved configuration of the thin film magnetic sensor 100 offers many advantages over the conventional thin film magnetic heads having flat edge pole tips.

It will be understood that the shaping of the pole tip from the air bearing sensor face 111 of the sensor 100 may be accomplished by a wide variety of methods, including (1) patterned photoresist lithography, followed by ion milling or ion etching; (2) focused ion beam without photoresist lithography; or (3) laser ablation without photoresist.

Figure 9:
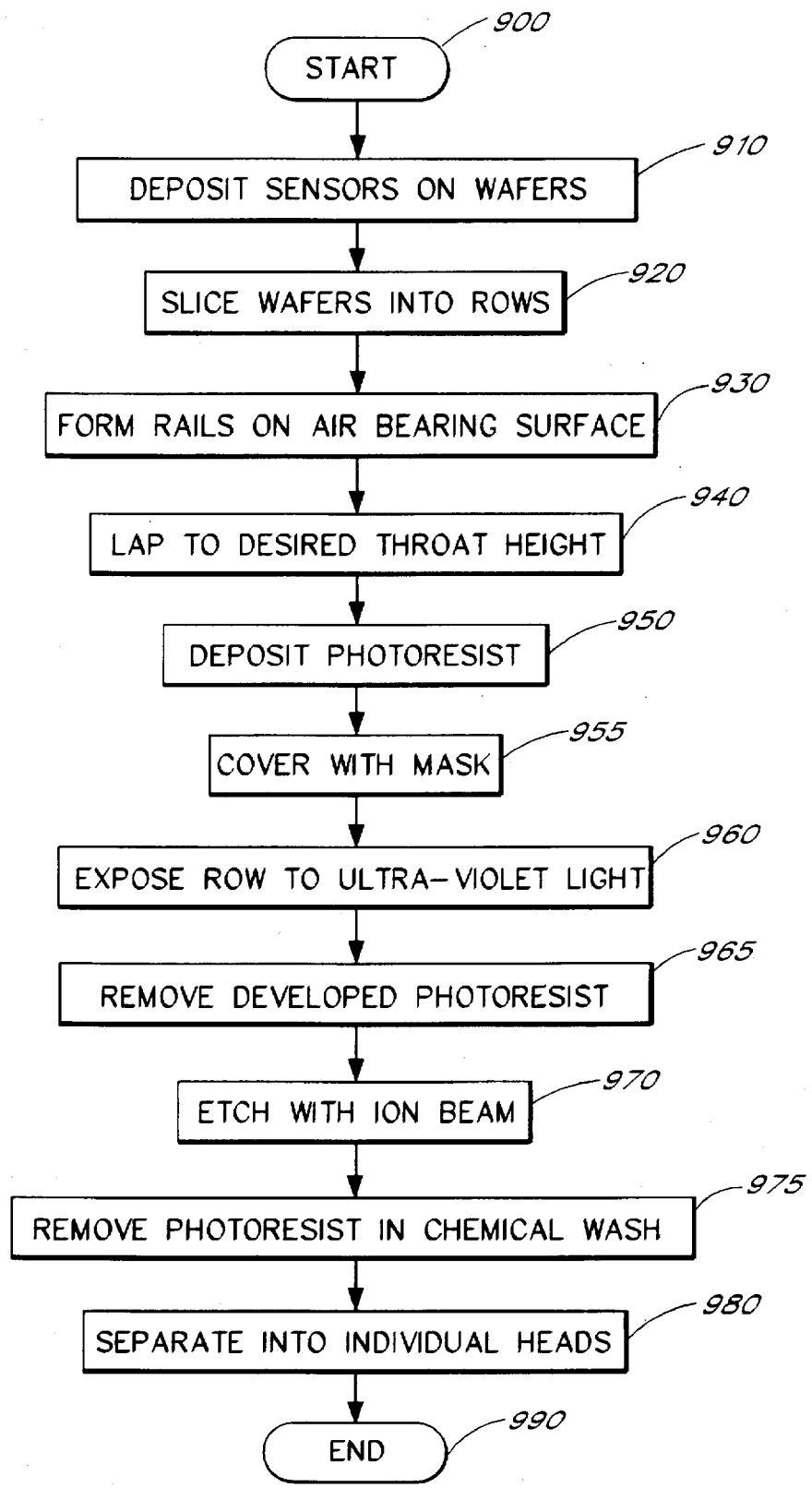
FIG. 9 is a flowchart which details the method used to shape the pole tip of the thin film recording head.

FIG. 9 is a flowchart which details the overall method used to manufacture the recording head sensor 100 and slider 40 of the present invention. The method begins as indicated in a start block 900, and a wafer having the thin film magnetic recording sensors 100 deposited thereon is produced as indicated in an activity block 910. Once the wafer is completed, the wafer is sliced into rows as indicated in the activity block 920. Each of the rows is precision manufactured and polished to form the air bearing rails 50 by removing the center portion of the air bearing surface 52 between the rails 50, as indicated by the activity block 930. Once the rails 50 have been formed, the rows are lapped to obtain the desired throat height, to insure that the pole tips are even, and to form the air bearing surface 52, as indicated by the activity block 940.

Once the lapping process has been completed, the etching process whereby the improved pole tip assembly 115 is formed is initiated. It should be noted here that the pole tips may be formed at the same time as the air bearing surface is etched to form an air bearing pattern (e.g., the pattern 60 shown in FIG. 3). Thus, the formation of the improved pole tip assembly 115 does not require additional orientation of the rows, thereby avoiding additional, time-consuming manufacturing steps. As indicated in the activity block 950, a photoresist layer is deposited over the pole tip surface portion of the sensor 100. A masking layer is then formed which covers those portions of the photoresist which are to remain, as shown in the activity block 955. The entire surface is then exposed to ultra-violet light as indicated in the activity block 960. The ultra-violet light develops the non-masked portions of the photoresist, and the developed portions of the photoresist are removed, as indicated by the activity block 965. Thus, a plurality of photoresist frames are formed which cover the pole tip surface of the thin film heads within the row. These photoresist frames protect the portions of the pole tip surface which are not to be etched.

Once the photoresist frames are formed, the exposed portions of the thin film heads are etched by means of conventional ion beam milling techniques or laser etching techniques, as indicated in the activity block 970. Once the desired pattern has been formed on the air bearing face of the heads, the excess photoresist is washed away in a chemical bath, as indicated by the activity block 975. Finally, the rows are separated into individual head sliders, as indicated by the activity block 980. The method is then complete, as indicated by the end block 990.

Figure 8A:
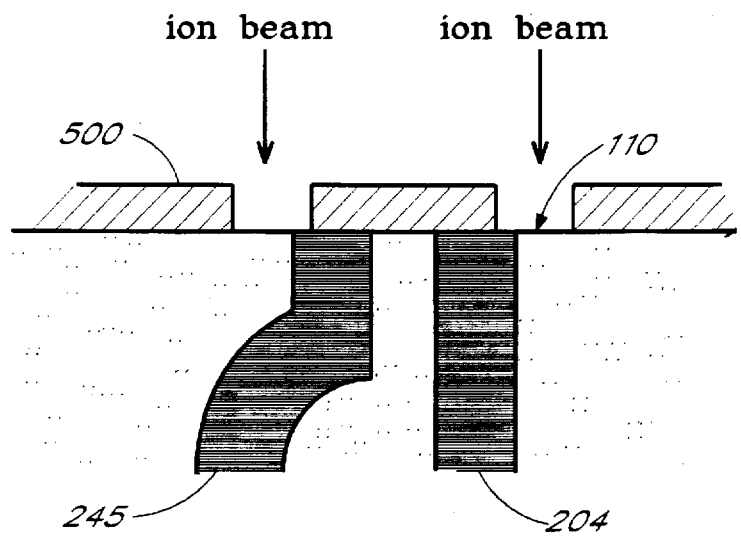
FIGS. 8a–8c are cross-sectional views which schematically illustrate the different steps used to shape the pole tip of the recording head of FIG. 2.
Figure 8B:
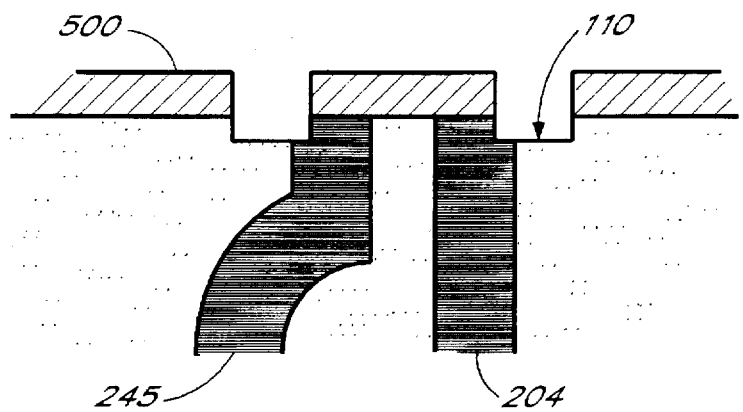
Figure 8C:
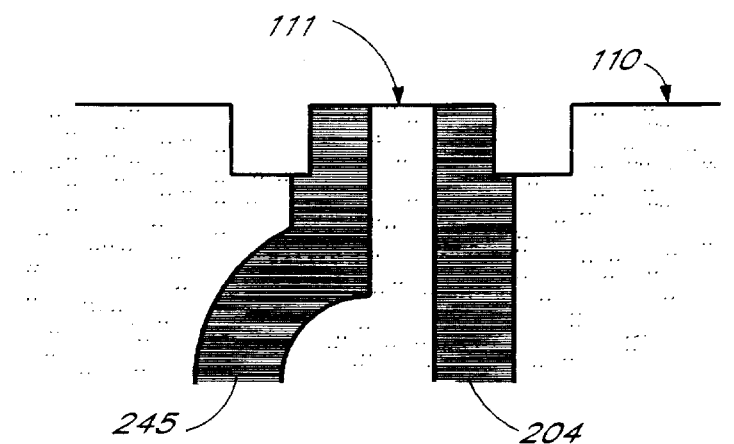

FIGS. 8a–8c depict more specifically the method employed to manufacture the pole tip assembly 115 by means of end-on (that is, from a position spaced from the rows in a direction perpendicular to the air bearing sensor face 111 of the sensor 100) ion beam etching. Originally, the air bearing sensor face 111 of the sensor 100 is lapped in a conventional manner to form an air bearing surface. Advantageously, this can be at the same time as the air bearing surface 52 of the slider 40 is formed. At this point in the production process, the pole tips 204, 245 are still rectangular in configuration and are flush with the rest of the face 111 of the sensor. FIGS. 8a–8c are cross-sectional views which show the steps used in the end-on ion beam etching process. First, a photoresist mask 500 is deposited on the air bearing sensor face 111 of the magnetic sensor 100. The photoresist mask 500 is configured by conventional methods (e.g., UV photo lithography techniques) to have a hexagonal center portion 510 covering the face of the pole tip while leaving a hexagonal portion 520 exposed over the desired regions of the air bearing face 110. The photo barrier 500 also protects the remaining portion of the air bearing face 110, although additional etching on the reminder of the air bearing face 110 of the sensor may be performed as bearing patterns are etched in the overall air bearing surface 52. Once the photo mask has been laid in the desired configuration, ion beam etching commences wherein chemically reactive ion radicals or other ionized particles accelerate towards the surface of the magnetic sensor 100. The photo barrier 500 is resistant to the ion beam so that it protects those regions of the air bearing sensor face 111 which are covered by the photo barrier 510. However, the exposed regions of the air bearing sensor face 111 are contacted by the ionized particles and react with these particles to form a volatile gas which evaporates off the air bearing sensor face 111 of the sensor. In this way, a hexagonal trench portion 530 is dug at desired depths in the unprotected or exposed regions of the air bearing sensor face 111. The result of the ion beam etching is depicted in FIG. 8b. Once the desired pattern is formed on the air bearing sensor face 111, the photoresist barrier 500 can be removed by conventional means such as acid washing, or other methods well understood in the art.

Figure 6C:
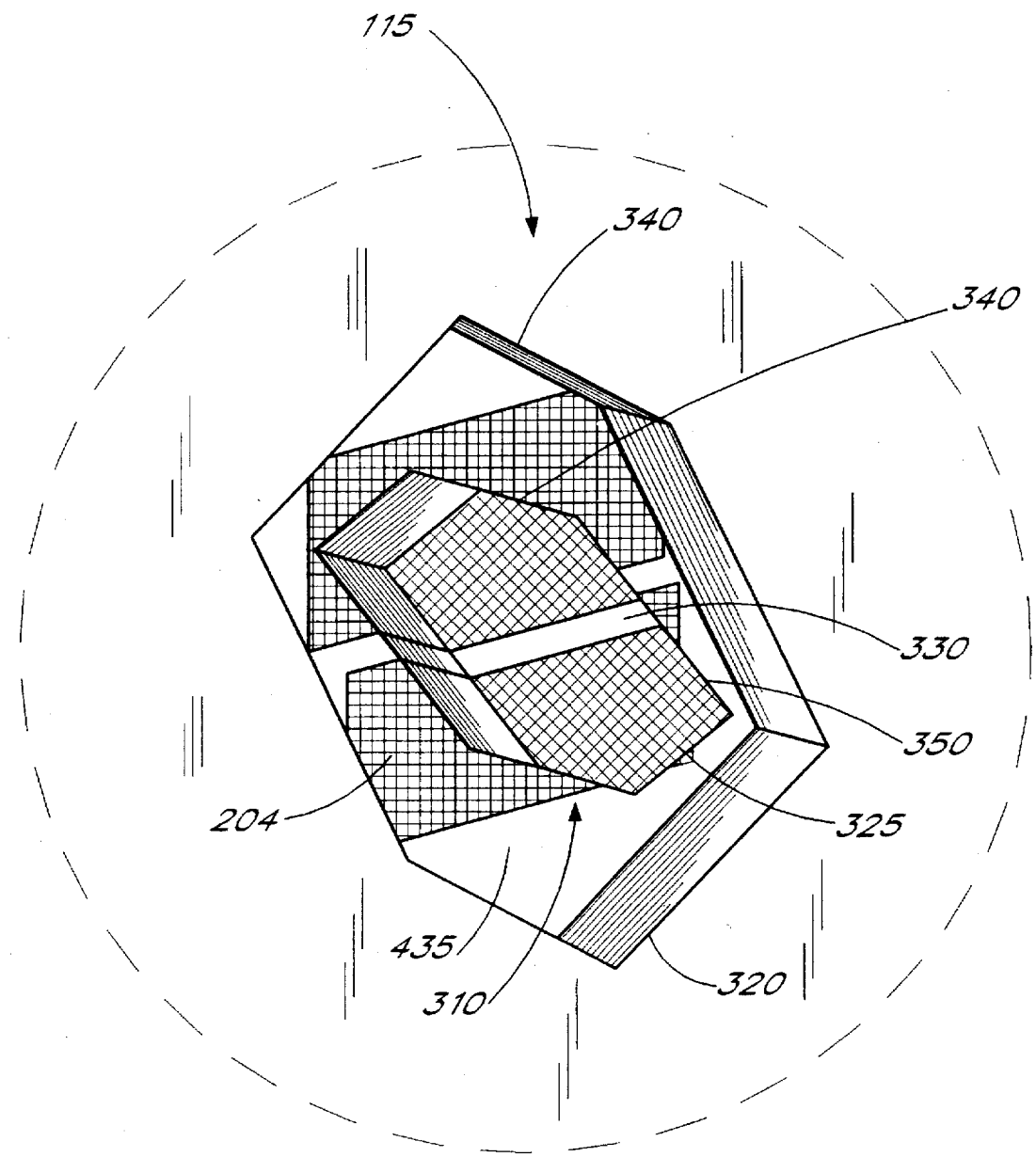
FIG. 6c shows an alternative embodiment wherein the pole tip is configured as a slanted hexagon.

FIG. 6c is an enlarged perspective view of an alternative embodiment of the invention wherein the pole tip assembly 115 includes the raised portion 310 formed in a slanted hexagonal configuration. Most notable about the pole tip configuration shown in FIG. 6c is that the side edges 350 are slanted so that they are parallel to one another, but are not perpendicular to the trailing edge of the leading pole 320. Because the sides 350 are parallel to one another, the track width remains constant even when small translational misalignment of a trench 435 occur, so long as the gap width is always less than the width of the original deposited pole tips 204, 245. Advantageously, the sides 350 intersect the trailing edge of the leading pole tip 320 (i.e., the edge of the pole tip 320 which is contiguous with the gap layer 330) at angles of between 45° and 135°. The inclination of the edges 350 may provide for optimum overwrite in some cases.

Figure 7A:
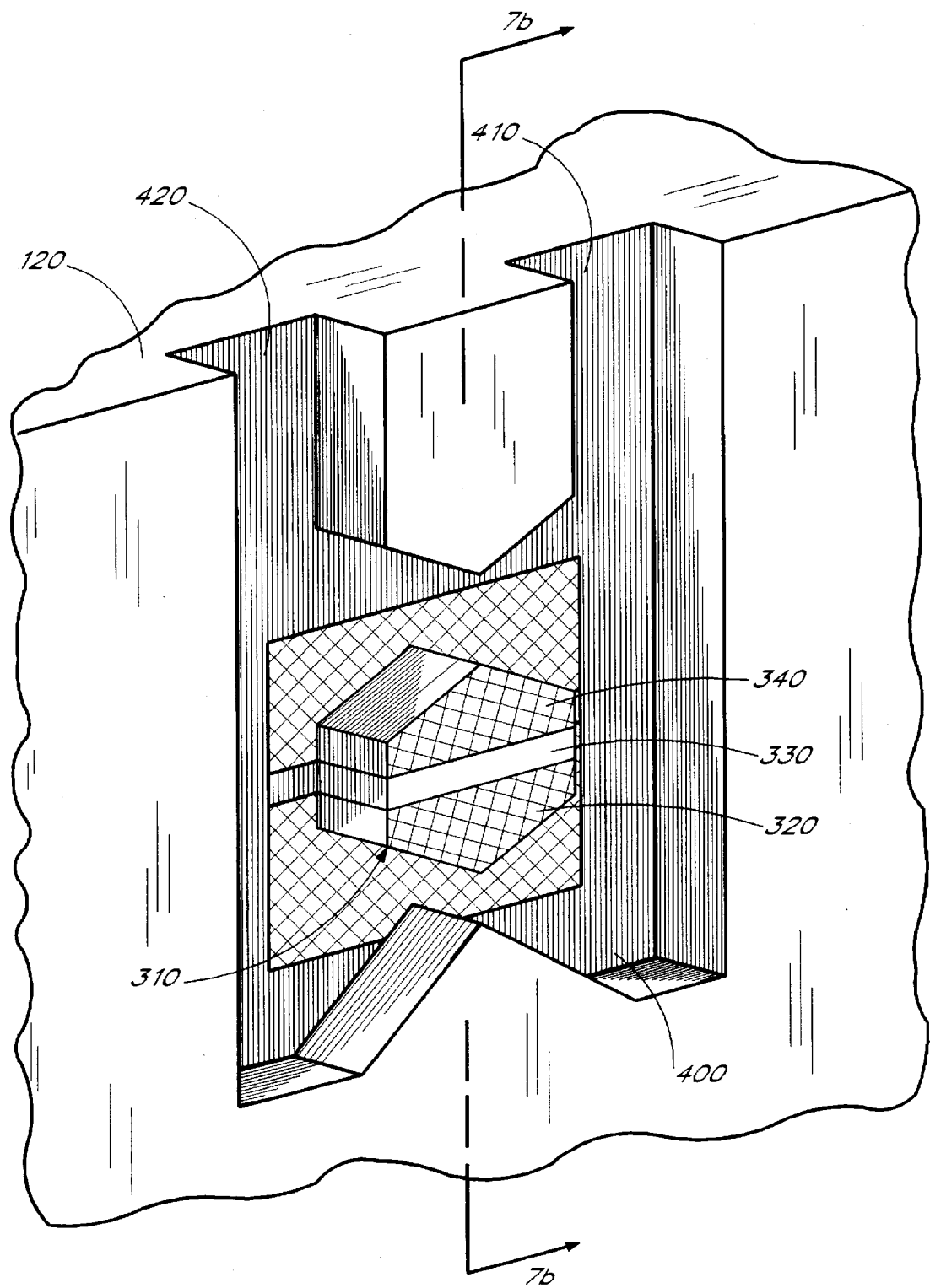
Figure 7B:
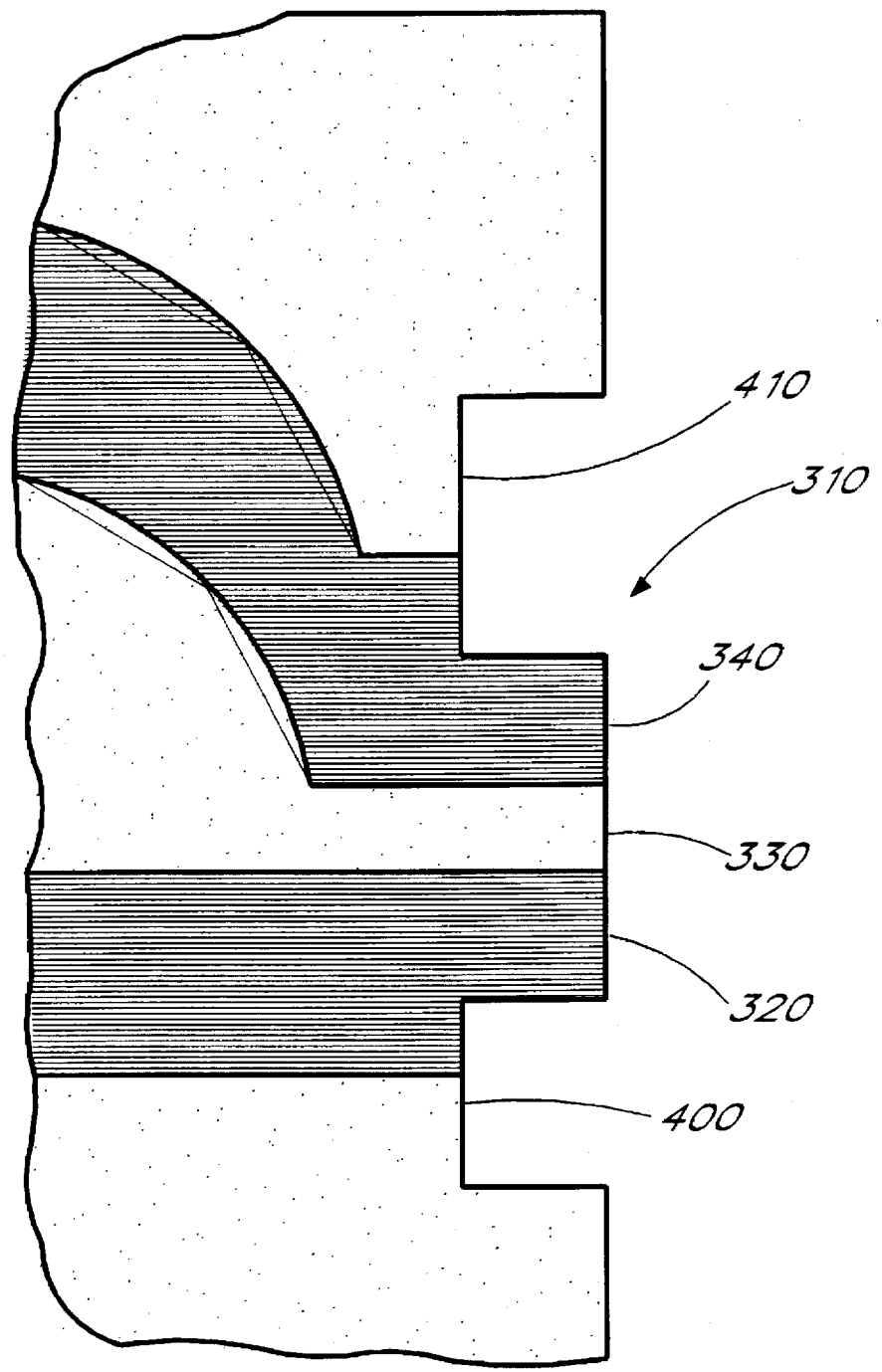

FIG. 7a is an enlarged perspective view of an alternative embodiment of the present invention wherein a trench 400 etched around the remaining raised portion 310 is not hexagonal but rather W-shaped. In addition, FIG. 7b is a side cross-sectional view along the line 7b—7b of the embodiment depicted in FIG. 7a. A trench configuration such as that depicted in FIG. 7a facilitates evacuation of debris which may collect within the trench 400 because the air bearing surface is so close to the magnetic medium. Simply stated, evacuation ports 410, 420 are provided as exhaust or exit ports for any debris which may be deposited within the trench 400. The evacuation is facilitated by the Bernoulli effect which naturally occurs as the head flies at high speeds above the magnetic medium 45. Again, the unique configuration of the pole tips 320, 340 provides for reduced amplitude and low gradient undershoot components of the data read pulses.

Figure 12:
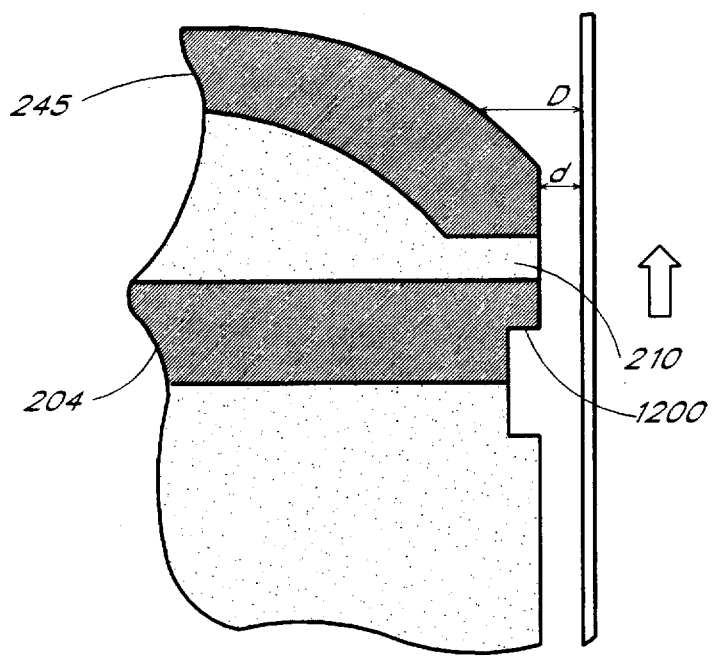
FIG. 12 depicts an alternative embodiment of the present invention.
Figure 13:
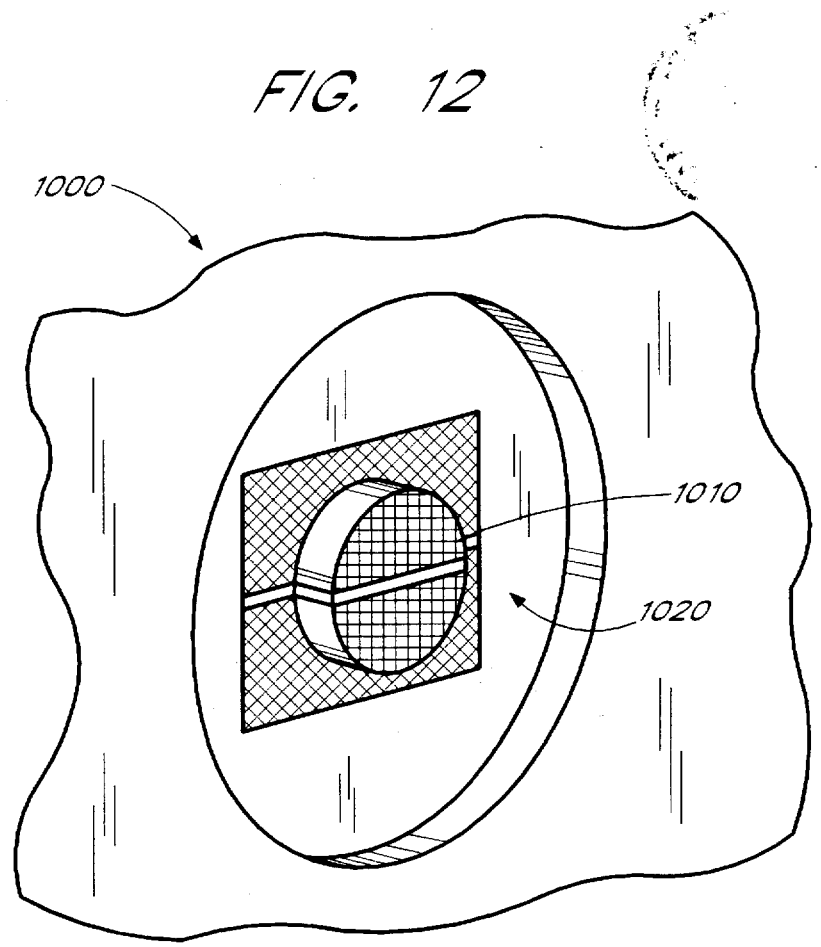
FIG. 13 depicts an alternative embodiment of the present invention wherein the pole tip assembly is manufactured to have a generally ellipsoidal configuration.

FIGS. 12 and 13 illustrate alternative embodiments of the present invention which also provide increased track trimming accuracy and speed, while simultaneously minimizing the deleterious effects due to undershoots. FIG. 12 is a side elevational view which depicts the leading and trailing poles 204, 245 as well as the gap layer 210. During the lapping process used to form the air bearing surface, the face 111 is lapped deep enough to remove substantially the entire outside throat (i.e., the outside throat height is substantially zero). Thus, the trailing pole 245 begins to angle upwards and recess away from the magnetic medium 45 as the medium 45 moves from bottom to top as shown in FIG. 12. That is, the distance d between the magnetic medium 45 and the trailing pole 245 gradually increases as the medium 45 moves past the pole tips so that the distance d is less than the distance D shown in FIG. 12. Because the distance from the magnetic medium 45 to the trailing pole 245 gradually increases as the medium 45 moves past, the fringe magnetic fields detected by the trailing pole 245 diminish gradually so that low amplitude, low gradient undershoot pulses are formed. The leading pole 204, having a pole tip 1200, is formed in substantially the same manner as the leading pole tip 320 depicted in FIGS. 6a and 7a so as to provide a low amplitude, low gradient lead in undershoot.

The alternative embodiment of a pole tip assembly 1000 depicted in FIG. 13 also produces low amplitude, low gradient undershoot components. Rather than having a generally elliptical configuration a raised portion 1010 is formed to have a generally circular shape. That is, the edge which delineates the surface of the raised portion 1010 is circular in configuration. A trench 1020 is etched around the raised portion and may also be circular in configuration. The embodiment of the pole tip assembly 1000 shown in FIG. 13 operates in much the same manner as the hexagonal embodiment by gradually detecting fringe magnetic fields so that low amplitude, low gradient undershoot pulses are formed. It should be noted here that, the embodiment depicted in FIG. 13 may also be track trimmed to form substantially vertical sides (like the sides 350 in the embodiments depicted in FIGS. 6a and 7a), as called for by the particular design considerations.

The present invention may be embodied in several different forms with various modifications without departing from its spirit or essence. As will be readily understood by those of ordinary skill in the art, the end-on ion milling process may be performed by a variety of substitute methods such as laser ablation without photoresist, etc. Furthermore, the configuration of the pole tip assembly may assume many shapes and sizes such as thombold, elliptical, and others. Therefore, the above description should be considered as illustrative and not restrictive. Rather, the present invention, under all of its variously contemplated forms and aspects, should be defined in light of the appended claims.

We claim:

1. A magnetic head for reading a magnetic media having a primary direction of motion, comprising:

a slider body defining an air bearing surface and a deposition surface generally perpendicular to said air bearing surface;

a first pole layer adjacent said deposition surface, said first pole layer defining a first face portion generally coplanar with said air bearing surface and a second face portion between said first face portion and said deposition surface, said first face portion defining a leading edge and a trailing edge, wherein the majority of said leading edge of said first face portion has a non-zero slope with respect to said primary direction of motion;

a gap layer adjacent said first pole layer, said gap layer defining a third face portion generally coplanar with said air bearing surface, a fourth face portion to a first side of said third face portion and a fifth face portion to a second side of said third face portion, wherein each of said second face portion, said fourth face portion and said fifth face portion is spaced from said air bearing surface;

a second pole layer adjacent said gap layer comprising a sixth face portion generally coplanar with said air bearing surface; and an encapsulation layer adjacent said second pole layer, wherein said first face portion further defines a planar third side and a planar fourth side, each of said third side and said fourth side connecting said leading edge and said trailing edge of said first face portion, and wherein said sixth face portion further comprises a planar fifth side abutting said gap layer coplanar with said third side of said first face portion and a planar sixth side abutting said gap layer coplanar with said fourth side of said first face portion.

2. The magnetic head of claim 1, wherein said second pole layer further comprises a seventh face portion between said sixth face portion and said encapsulation layer spaced from said air bearing surface, said sixth face portion defines a trailing edge wherein the majority of said trailing edge of said sixth face portion has a non-zero slope with respect to said primary direction of motion.

3. The magnetic head of claim 1, further comprising an open trench surrounding said first face portion and said sixth face portion and at least one evacuation port in a direction at least 90° degrees opposite to the primary direction of motion for the removal of debris which may collect in said trench.

* * * * *